(12) United States Patent
Sato et al.

(10) Patent No.: US 12,130,437 B2
(45) Date of Patent: Oct. 29, 2024

(54) IMAGE DISPLAY APPARATUS AND AR GLASSES

(71) Applicant: FUJIFILM Corporation, Tokyo (JP)

(72) Inventors: Hiroshi Sato, Minamiashigara (JP); Katsumi Sasata, Minamiashigara (JP); Yukito Saitoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 7 days.

(21) Appl. No.: 17/849,181

(22) Filed: Jun. 24, 2022

(65) Prior Publication Data

US 2022/0373809 A1 Nov. 24, 2022

Related U.S. Application Data

(63) Continuation of application No. PCT/JP2020/047378, filed on Dec. 18, 2020.

(30) Foreign Application Priority Data

Dec. 27, 2019 (JP) .................................. 2019-239115

(51) Int. Cl.
*G02B 27/01* (2006.01)
*G02F 1/1335* (2006.01)
*G02F 1/1337* (2006.01)

(52) U.S. Cl.
CPC ... *G02B 27/0172* (2013.01); *G02F 1/133504* (2013.01); *G02F 1/133543* (2021.01); *G02F 1/1337* (2013.01); *G02B 2027/0178* (2013.01)

(58) Field of Classification Search
CPC .......... G09F 9/00; G03B 21/604; G02B 5/30; G02B 5/18; G02B 2027/0174;
(Continued)

(56) References Cited

U.S. PATENT DOCUMENTS

| 10,215,987 B2 | 2/2019 | Morrison | |
|---|---|---|---|
| 2016/0033698 A1* | 2/2016 | Escuti | G02F 1/1334 349/194 |

(Continued)

FOREIGN PATENT DOCUMENTS

| JP | 2002-38158 A | 2/2002 |
|---|---|---|
| JP | 2016-109923 A | 6/2016 |

(Continued)

OTHER PUBLICATIONS

Japanese Office Action for corresponding Japanese Application No. 2021-567389, dated May 23, 2023, with English translation.

(Continued)

*Primary Examiner* — Mariam Qureshi
(74) *Attorney, Agent, or Firm* — Birch, Stewart, Kolasch & Birch, LLP

(57) ABSTRACT

Provided are: an image display apparatus that can display augmented reality in a virtual image is superimposed on a bright real scene; and AR glasses including the image display apparatus. The image display apparatus includes: a display element; and a reflective polarization diffraction element that reflects an image displayed by the display element, in which the polarization diffraction element has a region where a period of a diffraction structure decreases in a direction away from the display element.

22 Claims, 8 Drawing Sheets

(58) Field of Classification Search
CPC ............... G02B 5/3016; G02B 5/1833; G02B 2027/0178; G02B 27/0172; G02F 1/1337; G02F 1/133543; G02F 1/133504
See application file for complete search history.

(56) References Cited

U.S. PATENT DOCUMENTS

| | | |
|---|---|---|
| 2016/0161755 A1 | 6/2016 | Yonekubo et al. |
| 2018/0239177 A1* | 8/2018 | Oh ..................... G02B 6/0088 |
| 2020/0310182 A1* | 10/2020 | Murata ................ G02F 1/1333 |
| 2020/0326579 A1 | 10/2020 | Sato et al. |
| 2021/0011295 A1 | 1/2021 | Sato et al. |
| 2021/0116615 A1 | 4/2021 | Kodama et al. |

FOREIGN PATENT DOCUMENTS

| | | |
|---|---|---|
| JP | 2019-15783 A | 1/2019 |
| WO | WO 2019/131966 A1 | 7/2019 |
| WO | WO 2019/181247 A1 | 9/2019 |
| WO | WO 2019/189852 A1 | 10/2019 |

OTHER PUBLICATIONS

Japanese Notice of Reasons for Refusal for Japanese Application No. 2021-567389, dated Mar. 7, 2023, with an English translation.
International Preliminary Report on Patentability and English translation of the Written Opinion of the International Searching Authority for International Application No. PCT/JP2020/047378, dated Jul. 7, 2022.
International Search Report for International Application No. PCT/JP2020/047378, dated Mar. 16, 2021, with English translation.

* cited by examiner

IMAGE DISPLAY APPARATUS AND AR GLASSES

CROSS-REFERENCE TO RELATED APPLICATIONS

This application is a Continuation of PCT International Application No. PCT/JP2020/047378 filed on Dec. 18, 2020, which claims priority under 35 U.S.C. § 119(a) to Japanese Patent Application No. 2019-239115 filed on Dec. 27, 2019. Each of the above application(s) is hereby expressly incorporated by reference, in its entirety, into the present application.

BACKGROUND OF THE INVENTION

1. Field of the Invention

The present invention relates to an image display apparatus that are used in AR glasses or the like and AR glasses including the image display apparatus.

2. Description of the Related Art

Recently, an image display apparatus such as augmented reality (AR) glasses or a head-up display (HUD) that displays augmented reality by displaying a virtual image such as various images or various information to be superimposed on a scene (real scene) that is actually being seen has been put into practice.

The AR glasses are also called smart glasses.

FIG. 10 conceptually shows the image display apparatus described in U.S. Pat. No. 10,215,987B that displays augmented reality.

An image display apparatus 100 shown in FIG. 10 is a wearable heads-up display (AR glasses) and includes a display element 102, a spectacle lens 104, and a transparent combiner 106 attached to the spectacle lens 104.

FIG. 10 is a diagram showing the image display apparatus 100 (AR glasses) worn on an user U in case of being seen from the top. For example, the display element 102 is mounted on temples of AR glasses, and the spectacle lens 104 is a spectacle lens of the AR glasses.

The display element 102 is a laser projector, two-dimensionally scans a light beam modulated according to the virtual image A, and is incident into the transparent combiner 106.

The transparent combiner is a holographic combiner including at least one holographic element and diffracts and reflects the virtual image A displayed (projected) by the display element 102 to the user U. In the image display apparatus having the above-described configuration that displays augmented reality, it is known that a half mirror is used as the combiner instead of a diffraction element.

On the other hand, a real scene R that is seen by the user U who wears the image display apparatus 100 transmits through the spectacle lens 104 and the transparent combiner 106 and is observed by the user U.

As a result, the user U of the image display apparatus 100 can observe augmented reality in a state where the virtual image A and the real scene R are superimposed on each other.

SUMMARY OF THE INVENTION

Incidentally, in the image display apparatus in the related art that includes the diffraction element and the half mirror and displays augmented reality, there is a problem in that the real scene R is dark and inconspicuous.

As described above, in the image display apparatus that displays augmented reality, the user U observes the virtual image A reflected by the diffraction element (half mirror) and observes the real scene R transmitted through the diffraction element to display augmented reality where the virtual image A is superimposed on the real scene R.

In order to display the virtual image A having sufficient brightness (light amount), the reflectivity of the diffraction element needs to increase. However, in a case where the reflectivity of the diffraction element increases, the transmittance decreases. Therefore, the amount of the real scene R transmitted is small such that the brightness of the real scene decreases.

An object of the present invention is to solve the above-described problem of the related art and to provide: an image display apparatus that can display augmented reality in a virtual image is superimposed on a bright real scene; and AR glasses including the image display apparatus.

In order to achieve the object, the present invention has the following configurations.

[1] An image display apparatus comprising:
a display element; and
a reflective polarization diffraction element that reflects an image displayed by the display element,
in which the polarization diffraction element has a region where a period of a diffraction structure decreases in a direction away from the display element.

[2] The image display apparatus according to [1], further comprising:
a transparent substrate that supports the polarization diffraction element.

[3] The image display apparatus according to [1] or [2], in which the polarization diffraction element includes a cholesteric liquid crystal layer obtained by immobilizing a cholesteric liquid crystalline phase, and
the cholesteric liquid crystal layer has a liquid crystal alignment pattern in which a direction of an optical axis derived from a liquid crystal compound changes while continuously rotating in at least one in-plane direction.

[4] The image display apparatus according to [3], in which the polarization diffraction element includes a plurality of cholesteric liquid crystal layers in which surface pitches are different from each other in cross sections of the cholesteric liquid crystal layers observed with a scanning electron microscope, the surface pitch being an interval of bright portions and dark portions derived from the cholesteric liquid crystalline phase.

[5] The image display apparatus according to [4], in which in a case where, in the liquid crystal alignment pattern, a length over which the direction of the optical axis derived from the liquid crystal compound rotates by 180° in the one in-plane direction in which the direction of the optical axis derived from the liquid crystal compound changes while continuously rotating is set as a single period,
a permutation of lengths of the surface pitches and a permutation of lengths of the single periods match each other in the plurality of cholesteric liquid crystal layers in which the surface pitches are different from each other.

[6] The image display apparatus according to [4] or [5], in which in the cholesteric liquid crystal layers adjacent to each other in the plurality of cholesteric liquid crystal layers in which the surface pitches are different from each other, turning directions of circularly polarized light to be selectively reflected are opposite to each other.

[7] The image display apparatus according to any one of [3] to [6],
in which in a case where an in-plane retardation is measured from a normal direction of a main surface of the cholesteric liquid crystal layer and a direction tilted with respect to a normal line of the main surface, a direction in which the in-plane retardation is the minimum in any one of a slow axis plane or a fast axis plane is tilted from the normal direction.

[8] The image display apparatus according to any one of [3] to [7],
in which the cholesteric liquid crystal layer has a pitch gradient structure that is a structure having a region where a surface pitch changes in a cross section of the cholesteric liquid crystal layer observed with a scanning electron microscope, the surface pitch being an interval of bright portions and dark portions derived from the cholesteric liquid crystalline phase.

[9] The image display apparatus according to any one of [1] to [8],
in which a retardation plate is provided between the display element and the polarization diffraction element.

[10] The image display apparatus according to [9],
in which the retardation plate is a λ/4 plate.

[11] The image display apparatus according to [9] or [10],
in which the retardation plate has reverse wavelength dispersibility.

[12] AR glasses comprising:
the image display apparatus according to any one of [1] to [11].

According to an aspect of the present invention, augmented reality in which the brightness of a real scene is high can be displayed in an image display apparatus that displays augmented reality where a virtual image is superimposed on a real scene.

DESCRIPTION OF THE PREFERRED EMBODIMENTS

Hereinafter, an image display apparatus and AR glasses according to an embodiment of the present invention will be described in detail based on a preferable embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same" includes a case where an error range is generally allowable in the technical field. In addition, in the present specification, the meaning of "all", "entire", or "entire surface" includes not only 100% but also a case where an error range is generally allowable in the technical field, for example, 99% or more, 95% or more, or 90% or more.

In the present specification, visible light refers to light having a wavelength which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

Figure 1:
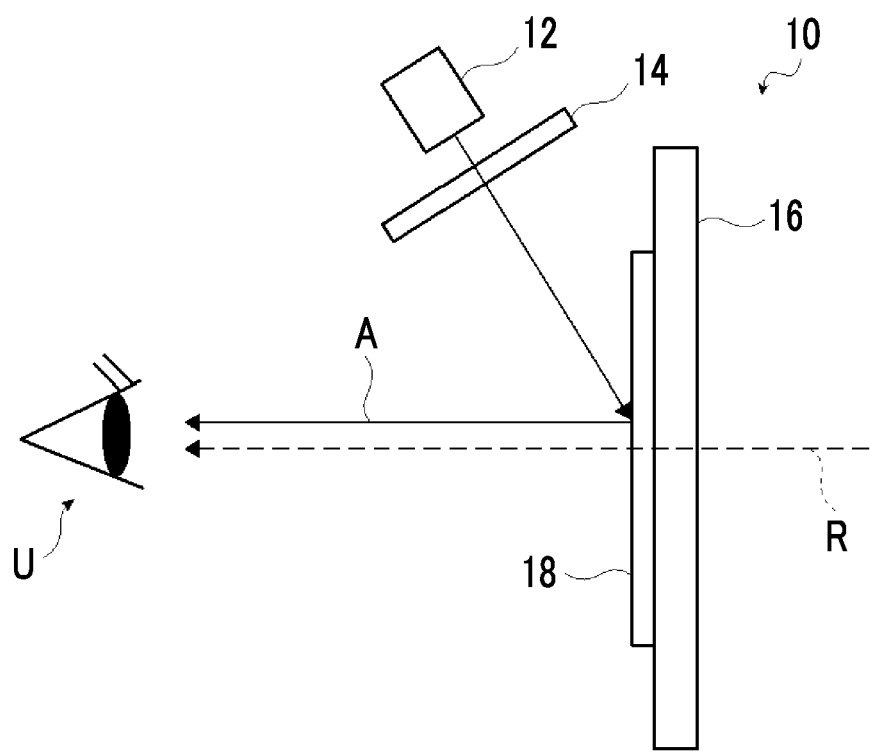
FIG. 1 is a diagram conceptually showing an example of an image display apparatus according to the present invention.

FIG. 1 conceptually shows an example of the image display apparatus according to the embodiment of the present invention.

The image display apparatus according to the embodiment of the present invention is an image display apparatus that displays augmented reality where a virtual image A is superimposed on a real scene R and is used in AR glasses, a HUD, a head-mounted display (HMD), or the like.

An image display apparatus 10 shown in FIG. 1 includes a display element 12, a retardation plate 14, a transparent substrate 16, and a polarization diffraction element 18. The polarization diffraction element 18 is a reflective polarization diffraction element.

In the image display apparatus 10, the real scene R transmits through the transparent substrate 16 and the polarization diffraction element 18 to be observed by the user U.

On the other hand, although described below in detail, the virtual image A (projected image) displayed by the display element 12 is converted into predetermined circularly polarized light by the retardation plate 14, is diffracted by the polarization diffraction element 18 to be reflected to the user U, and is observed by the user U.

As a result, the user U of the image display apparatus 10 observes augmented reality where the virtual image A is superimposed on the real scene R.

The image display apparatus 10 is, for example, AR glasses.

Hereinafter, each of the components in the image display apparatus according to the embodiment of the present invention will be described.

Display Element

In the image display apparatus 10 according to the embodiment of the present invention, the display element 12 displays (projects) the virtual image A. In other words, the display element 12 displays an image that forms the virtual image A.

In the present invention, as the display element 12, various well-known display elements (a display device or a projector) used for AR glasses or the like can be used without any particular limitation.

Accordingly, the display in the display element 12 is not particularly limited. For example, various well-known display elements 12 used in AR glasses, a HUD, or the like can be used. Examples of the display element 12 include a liquid crystal display (LCD), an organic electroluminescent display (OLED (organic light emitting diode)), a liquid crystal on silicon (LCOS) display, a digital light processing (DLP) display, and a scanning type display that two-dimensionally scans a light beam modulated according to an image using a laser light source and a micro electro mechanical systems (MEMS) element.

In the image display apparatus 10 according to the embodiment of the present invention, it is preferable that the display element 12 displays the virtual image A of linearly polarized light.

Accordingly, in a case where a display such as a scanning type display including a laser light source that emits linearly polarized light or a LCD that displays an image of linearly polarized light is used as the display, the display element 12 can be formed using only the display.

On the other hand, in a case where a display such as an OLED that displays an image of unpolarized light is used as the display, it is preferable that the display element 12 is formed using the display and a polarizer in combination to display an image of linearly polarized light.

The polarizer is not particularly limited, and various well-known polarizers can be used. Accordingly, as the polarizer, any of an iodine polarizer, a dye-based polarizer using a dichroic dye, a polyene polarizer, or a polarizer formed of a material that polarizes light by UV absorption may be used.

As described above, the image display apparatus 10 in the example shown in the drawing is, for example, AR glasses. FIG. 1 is a diagram conceptually showing the image display apparatus 10 in a state where the user U wears AR glasses in case of being seen from the top (the top side among the top side and bottom side).

In the image display apparatus 10, the display element 12 is mounted on, for example, temples of the AR glasses.

In a case where a display that displays a surface-shaped image on a display surface of LCD, an OLED, or the like is used as the display forming the display element 12, optionally, a lens that focuses the virtual image A displayed by the display element 12 may be provided between the display element 12 and the retardation plate 14.

As the lens, a well-known condenser lens that focuses the virtual image A displayed by the display element 12 can be used.

Retardation Plate

The retardation plate 14 converts the virtual image A of linearly polarized light displayed by the display element 12 into the virtual image A of predetermined circularly polarized light corresponding to the polarization diffraction element 18.

In the image display apparatus 10 in the example shown in the drawing, the retardation plate 14 converts, for example, the virtual image A of linearly polarized light into the virtual image A of right circularly polarized light.

It is preferable that the retardation plate 14 is a λ/4 plate (¼ wave plate).

As is well known, the cholesteric liquid crystalline phase selectively reflects right or left circularly polarized light. Accordingly, by using the λ/4 plate as the retardation plate 14, the virtual image A of linearly polarized light is suitably converted into the virtual image A of right circularly polarized light such that the utilization efficiency of the virtual image A displayed by the display element 12 can be improved.

As the retardation plate 14, a well-known retardation plate can be used. For example, various well-known retardation plates, for example, a cured layer or a structural birefringent layer of a polymer or a liquid crystal compound can be used.

As the retardation plate 14, a retardation plate in which a plurality of retardation plates are laminated to effectively exhibit a desired action is also preferable. As a λ/4 plate, a retardation plate in which a plurality of retardation plates are laminated to effectively function as a λ/4 plate is also preferably used. For example, a broadband λ/4 plate described in WO2013/137464A in which a λ/4 plate and a λ/4 plate are used in combination can handle with incidence light in a wide wavelength range and can be preferably used.

Further, it is preferable that the retardation plate 14 has reverse wavelength dispersibility. In a case where the retardation plate 14 has reverse wavelength dispersibility, incidence light in a wide wavelength range can be handled.

The retardation plate 14 is disposed in a state where a direction of a slow axis is adjusted such that the linearly polarized light is converted into circularly polarized light having a desired turning direction depending on a polarization direction of the linearly polarized light of the image displayed by the display element 12.

Transparent Substrate

The transparent substrate 16 supports the polarization diffraction element 18.

The transparent substrate 16 is not particularly limited, and substrates formed of glass or various well-known materials, for example, a resin material such as a (meth)acrylic resin, a triacetyl cellulose (TAC) film, polyethylene terephthalate (PET), polycarbonate, polyvinyl chloride, or polyolefin can be used as long as they have sufficient transparency for observing the real scene R and can support the polarization diffraction element 18.

As described above, the image display apparatus 10 is, for example, AR glasses. In the image display apparatus 10, the transparent substrate 16 is, for example, a spectacle lens of AR glasses.

In the image display apparatus according to the embodiment of the present invention, the transparent substrate 16 is provided as a preferable aspect.

Accordingly, in a case where a member that has sufficient transparency for observing the real scene R and can support the polarization diffraction element 18 is present in a use environment of the image display apparatus according to the embodiment of the present invention, the polarization diffraction element 18 may be supported by this member to configure the image display apparatus according to the embodiment of the present invention.

Polarization Diffraction Element

Figure 2:
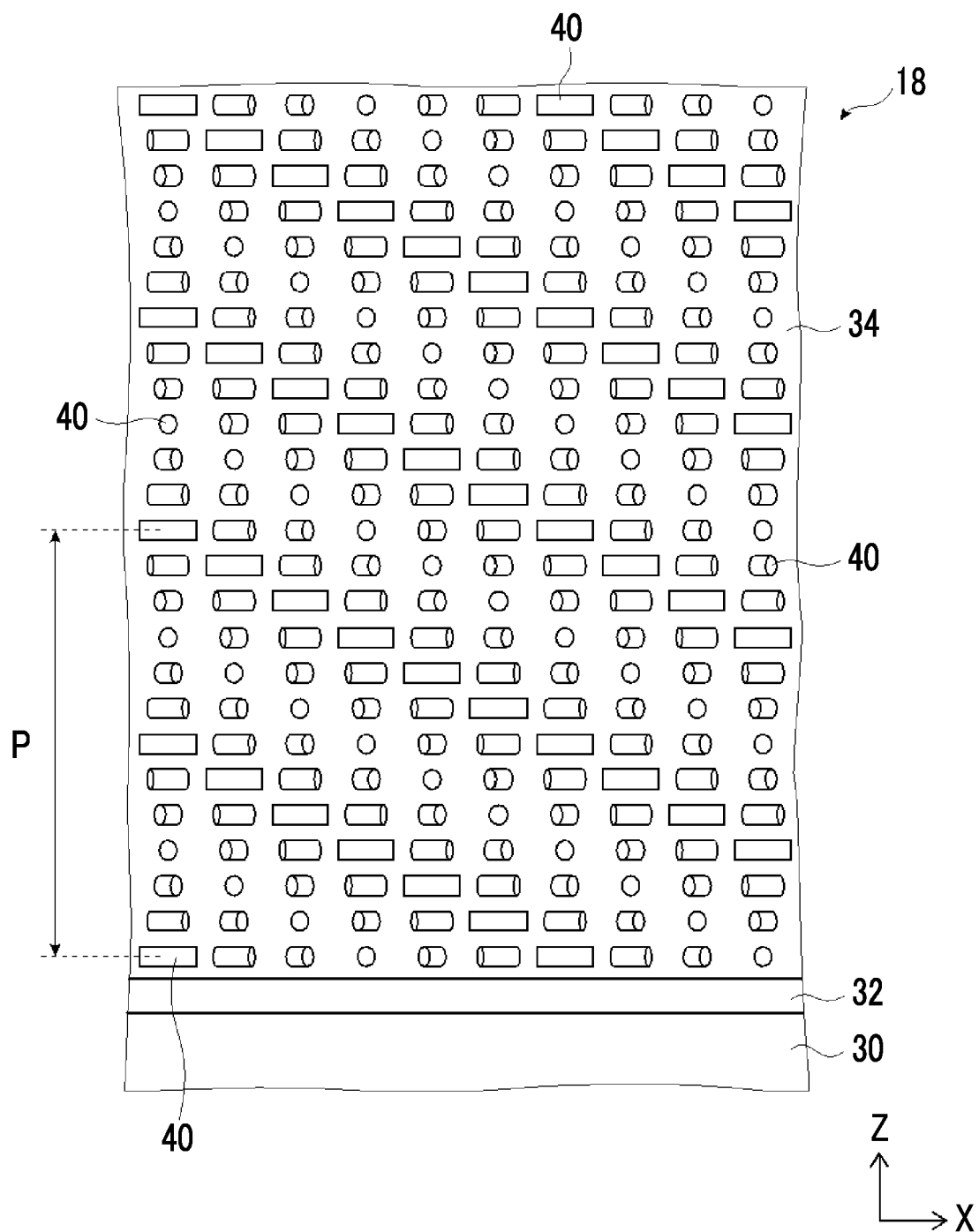
FIG. 2 is a diagram conceptually showing a polarization diffraction element.

FIG. 2 conceptually shows an example of the polarization diffraction element 18. The polarization diffraction element 18 includes a support 30, an alignment film 32, and a cholesteric liquid crystal layer 34.

The cholesteric liquid crystal layer 34 is obtained by immobilizing a cholesteric liquid crystalline phase. As is well known, the cholesteric liquid crystalline phase has a helical structure in which a liquid crystal compound is helically turned and laminated, selectively reflects right circularly polarized light or left circularly polarized light in a predetermined wavelength range, and allow transmission of the other light.

For example, the cholesteric liquid crystal layer 34 in the example shown in the drawing selectively reflects right circularly polarized light of green light and allows transmission of the other light. Accordingly, in the image display apparatus 10, it is preferable that the display element 12 displays a green monochromic image and the virtual image A is a green monochromic image.

Hereinafter, the polarization diffraction element will be described using FIGS. 2 and 3.

FIG. 2 is a diagram conceptually showing a layer configuration of the polarization diffraction element. As described above, the polarization diffraction element includes the support 30, the alignment film 32, and the cholesteric liquid crystal layer 34 as a liquid crystal diffraction element that exhibits an action as a reflective polarization diffraction element.

Figure 3:
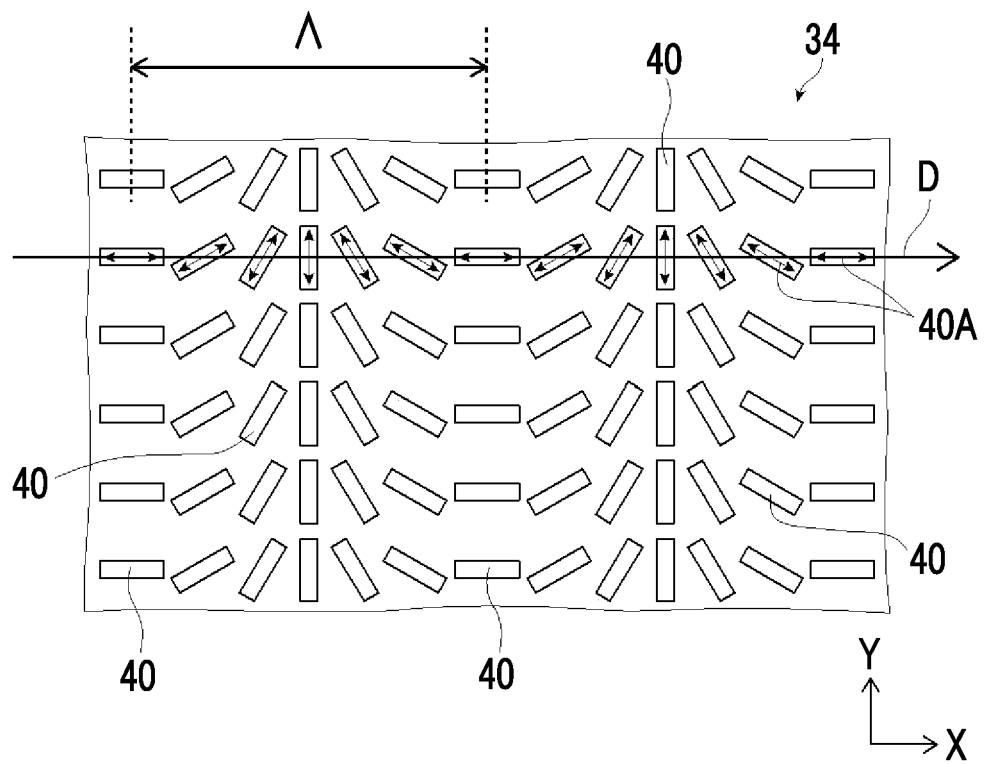
FIG. 3 is a plan view conceptually showing the cholesteric liquid crystal layer.

FIG. 3 is a schematic diagram showing an alignment state of a liquid crystal compound 40 in a plane of a main surface of the cholesteric liquid crystal layer 34. The main surface is the maximum surface of a sheet-shaped material (a film, a plate-shaped material, or a layer).

In the following description, it is assumed that a main surface of the cholesteric liquid crystal layer 34 is an X-Y plane and a cross-section perpendicular to the X-Y plane is a X-Z plane. That is, FIG. 2 corresponds to a schematic diagram of the X-Z plane of the cholesteric liquid crystal layer 34, and FIG. 3 corresponds to a schematic diagram of the X-Y plane of the cholesteric liquid crystal layer 34.

As shown in FIG. 2, the cholesteric liquid crystal layer 34 is a layer obtained by cholesteric alignment of the liquid crystal compound 40. In addition, FIGS. 2 and 3 show an example in which the liquid crystal compound forming the cholesteric liquid crystal layer is a rod-like liquid crystal compound.

In the following description, the cholesteric liquid crystal layer will also be referred to as "liquid crystal layer".

The polarization diffraction element 18 shown in FIG. 2 includes the support 30, the alignment film 32, and the liquid crystal layer 34. However, the present invention is not limited to this configuration.

The polarization diffraction element may include only the alignment film 32 and the liquid crystal layer 34 by peeling off the support 30 after forming the liquid crystal layer 34. Alternatively, the polarization diffraction element may include only the liquid crystal layer 34 by peeling off the support 30 and the alignment film 32 after forming the liquid crystal layer 34.

Support

The support 30 supports the alignment film 32 and the liquid crystal layer 34.

As the support 30, various sheet-shaped materials (films or plate-shaped materials) can be used as long as they can support the alignment film 32 and the liquid crystal layer 34.

A transmittance of the support 30 with respect to corresponding light is preferably 50% or higher, more preferably 70% or higher, and still more preferably 85% or higher.

The thickness of the support 30 is not particularly limited and may be appropriately set depending on the use of the polarization diffraction element, a material for forming the support 30, and the like in a range where the alignment film 32 and the liquid crystal layer 34 can be supported.

The thickness of the support 30 is preferably 1 to 2000 µm, more preferably 3 to 500 µm, and still more preferably 5 to 250 µm.

The support 30 may have a monolayer structure or a multi-layer structure.

In a case where the support 30 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 30 has a multi-layer structure, examples thereof include a support including: one of the above-described supports having a monolayer structure that is provided as a substrate; and another layer that is provided on a surface of the substrate.

Alignment Film

In the polarization diffraction element, the alignment film 32 is formed on a surface of the support 30.

The alignment film 32 is an alignment film for aligning the liquid crystal compound 40 to a predetermined liquid crystal alignment pattern during the formation of the liquid crystal layer 34.

Although described below, in the present invention, the liquid crystal layer 34 has a liquid crystal alignment pattern in which a direction of an optical axis 40A (refer to FIG. 3) derived from the liquid crystal compound 40 changes while continuously rotating in one in-plane direction. In the following description, "the direction of the optical axis 40A rotates" will also be simply referred to as "the optical axis 40A rotates".

As described above, the liquid crystal layer 34 acts as a reflective polarization diffraction element. In the liquid crystal alignment pattern of the liquid crystal layer 34, a single period over which the optical axis 40A rotates by 180° in one in-plane direction in which the optical axes 40A rotates is a period of the diffraction structure. In addition, the liquid crystal layer 34 has a region in which the length of the single period in which the optical axis 40A rotates by 180° in the liquid crystal alignment pattern gradually decreases in a direction away from the display element 12.

Accordingly, the alignment film 32 is formed such that the liquid crystal layer 34 can form the liquid crystal alignment pattern.

As the alignment film 32, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film 32 formed by a rubbing treatment can be formed by rubbing a surface of a polymer layer with paper or fabric in a given direction multiple times.

As the material used for the alignment film 32, for example, a material for forming polyimide, polyvinyl alcohol, a polymer having a polymerizable group described in JP1997-152509A (JP-H9-152509A), or an alignment film such as JP2005-097377A, JP2005-099228A, and JP2005-128503A is preferable.

In the polarization diffraction element 18, for example, the alignment film 32 can be suitably used as a so-called photo-alignment film obtained by irradiating a photo-alignment material with polarized light or non-polarized light.

That is, in the polarization diffraction element, a photo-alignment film that is formed by applying a photo-alignment material to the support 30 is suitably used as the alignment film 32.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP 1997-118717A (JP-H9-118717A), JP1998-506420A (JP-H10-506420A), JP2003-505561A, WO2010/150748A, JP2013-177561A, and JP2014-012823A.

Among these, an azo compound, a photocrosslinking polyimide, a photocrosslinking polyamide, a photocrosslinking polyester, a cinnamate compound, or a chalcone compound is suitably used.

The thickness of the alignment film 32 is not particularly limited. The thickness with which a required alignment function can be obtained may be appropriately set depending on the material for forming the alignment film 32.

The thickness of the alignment film 32 is preferably 0.01 to 5 μm and more preferably 0.05 to 2 μm.

A method of forming the alignment film 32 is not limited. Any one of various well-known methods corresponding to a material for forming the alignment film 32 can be used. For example, a method including: applying the alignment film 32 to a surface of the support 30; drying the applied alignment film 32; and exposing the alignment film 32 to laser light to form an alignment pattern can be used.

Figure 9:
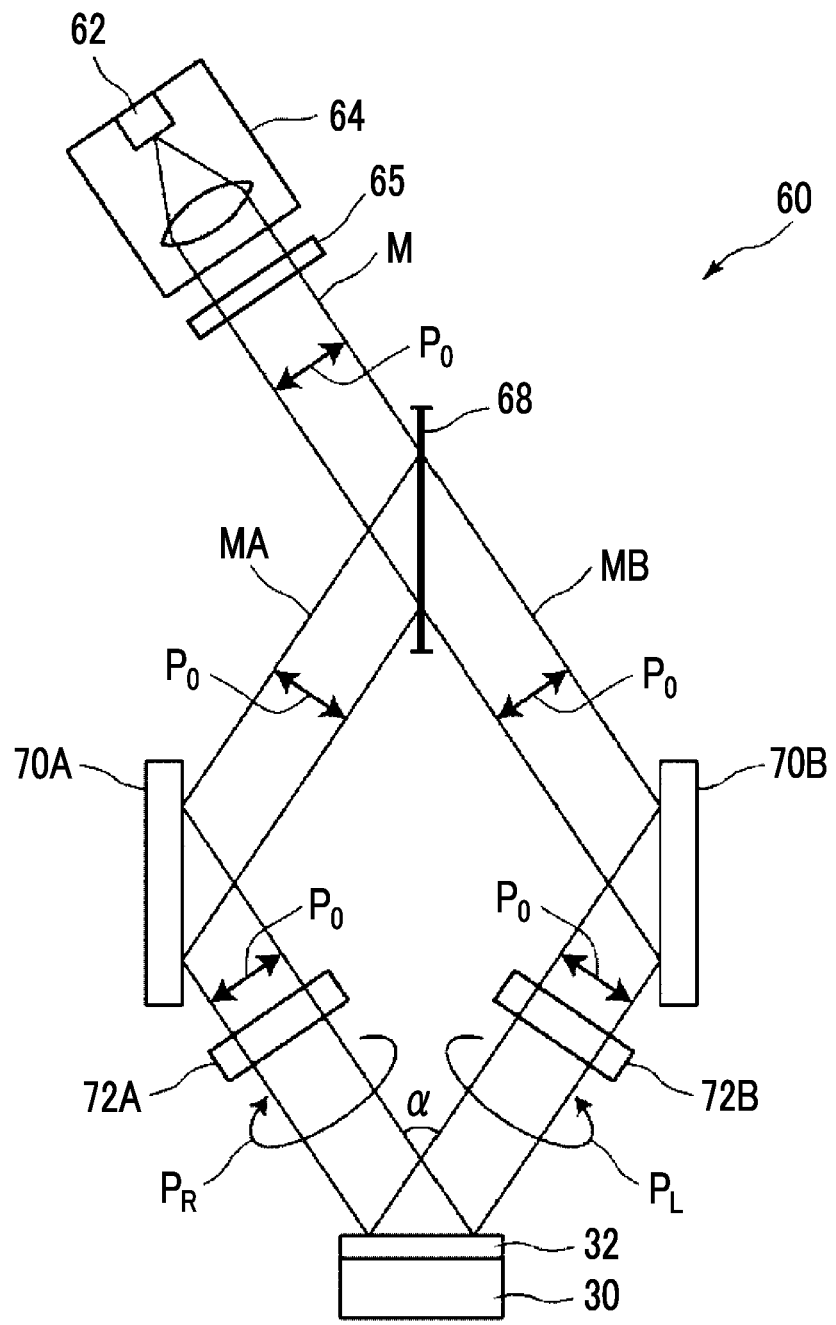
FIG. 9 is a diagram conceptually showing an example of an exposure device that exposes an alignment film.
Figure 10:
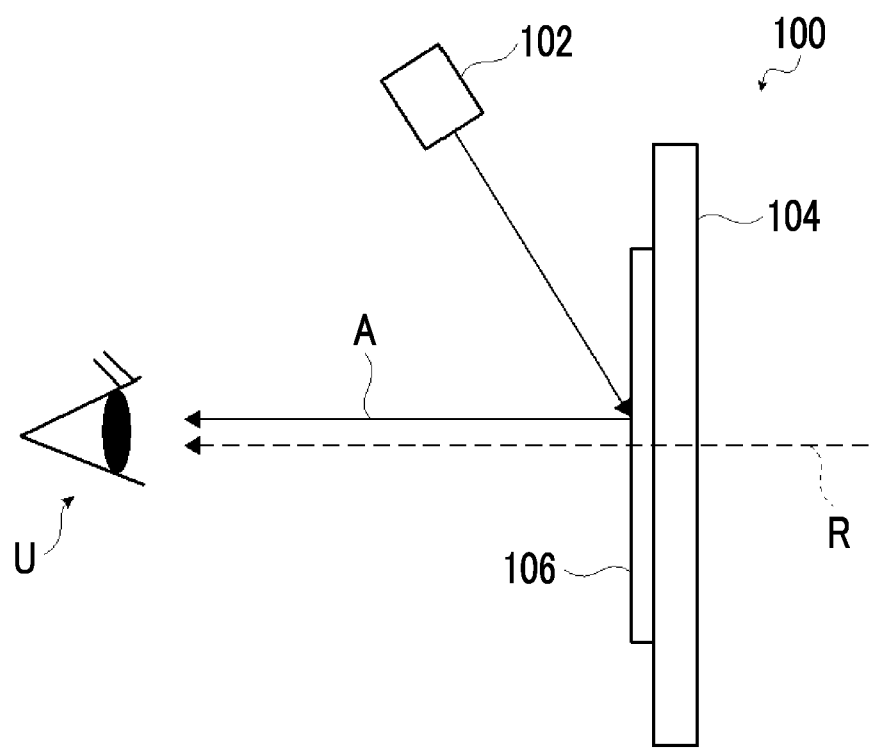
FIG. 10 is a diagram conceptually showing an example of an image display apparatus in the related art.

FIG. 9 conceptually shows an example of an exposure device that exposes the alignment film 32 to form an alignment pattern.

An exposure device 60 shown in FIG. 9 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the two split beams MA and MB; and λ/4 plates 72A and 72B.

The light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 30 including the alignment film 32 on which the alignment pattern is not yet formed is disposed at an exposed portion, the two beams MA and MB intersect and interfere with each other on the alignment film 32, and the alignment film 32 is irradiated with and exposed to the interference light.

Due to the interference in this case, the polarized state of light with which the alignment film 32 is irradiated periodically changes according to interference fringes. As a result, an alignment film having an alignment pattern in which the alignment state periodically changes can be obtained. In the following description, this alignment film having the alignment pattern will also be referred to as "patterned alignment film".

In the exposure device 60, by changing an intersecting angle α between the two beams MA and MB, the period of the alignment pattern can be adjusted. That is, by adjusting the intersecting angle α in the exposure device 60, in the liquid crystal alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted.

Accordingly, by repeating an operation of adjusting the intersecting angle α according to a desired length of the single period, covering regions other than a region having the length of the single period with a mask or the like, and exposing the alignment film 32, the alignment film 32 including the alignment pattern having the region in which the length of the single period gradually decreases in the direction away from the display element 12 can be formed.

Alternatively, by disposing a lens element after a λ/4 plate 72A or a λ/4 plate 72B in the exposure device 60 and exposing the alignment film 32, the alignment film 32 including the alignment pattern having the region in which the length of the single period gradually decreases in the direction away from the display element 12 can be formed.

By forming the cholesteric liquid crystal layer on the alignment film 32 having the alignment pattern in which the alignment state periodically changes, as described below, the liquid crystal layer 34 having the liquid crystal alignment pattern in which the optical axis 40A derived from the liquid crystal compound 40 continuously rotates in the one in-plane direction and having the region in which the length of the single period decreases in the direction away from the display element 12 can be formed.

In addition, by rotating the optical axes of the λ/4 plates 72A and 72B by 90°, respectively, the rotation direction of the optical axis 40A can be reversed.

As described above, the patterned alignment film has a liquid crystal alignment pattern in which the liquid crystal compound is aligned such that the direction of the optical axis of the liquid crystal compound in the liquid crystal layer formed on the patterned alignment film changes while continuously rotating in at least one in-plane direction.

In a case where an axis in the direction in which the liquid crystal compound is aligned is an arrangement axis, it can be said that the patterned alignment film has an alignment pattern in which the direction of the arrangement axis changes while continuously rotating in at least one in-plane direction. The arrangement axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that a direction in which the light amount is the maximum or the minimum gradually changes in the one in-plane direction.

In the present invention, the alignment film 32 is provided as a preferable aspect and is not an essential component.

For example, the following configuration can also be adopted, in which, by forming the alignment pattern on the support 30 using a method of rubbing the support 30, a method of processing the support 30 with laser light or the like, the liquid crystal layer has the liquid crystal alignment pattern in which the direction of the optical axis 40A derived from the liquid crystal compound 40 changes while continuously rotating in at least one in-plane direction. That is, in the present invention, the support 30 may be made to function as the alignment film.

Cholesteric Liquid Crystal Layer (Liquid Crystal Layer)

In the polarization diffraction element, the liquid crystal layer 34 is formed on a surface of the alignment film 32.

The liquid crystal layer 34 is a cholesteric liquid crystal layer that is obtained by immobilizing a cholesteric liquid crystalline phase and has a liquid crystal alignment pattern in which a direction of an optical axis derived from a liquid crystal compound changes while continuously rotating in at least one in-plane direction.

As conceptually shown in FIG. 2, the liquid crystal layer 34 has a helical structure in which the liquid crystal compound 40 is helically turned and laminated as in a cholesteric liquid crystal layer obtained by immobilizing a typical cholesteric liquid crystalline phase. In the helical structure, a configuration in which the liquid crystal compound 40 is helically rotated once (rotated by 360°) and laminated is set as one helical pitch (helical pitch), and plural pitches of the helically turned liquid crystal compound 40 are laminated.

As is well known, the cholesteric liquid crystalline phase exhibits selective reflectivity with respect to left or right circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystalline phase is right, right circularly polarized light is reflected, and in a case where the helical twisted direction of the cholesteric liquid crystalline phase is left, left circularly polarized light is reflected.

As described above, the liquid crystal layer 34 selectively reflects right circularly polarized light of green light. Accordingly, in the liquid crystal layer 34, the helical twisted direction of the cholesteric liquid crystalline phase is the right direction.

The turning direction of the cholesteric liquid crystalline phase can be adjusted by adjusting the kind of the liquid crystal compound that forms the cholesteric liquid crystal layer and/or the kind of the chiral agent to be added.

In addition, a half-width $\Delta\lambda$ (nm) of a selective reflection range (circularly polarized light reflection range) where selective reflection is exhibited depends on $\Delta n$ of the cholesteric liquid crystalline phase and the helical pitch and satisfies a relationship of "$\Delta\lambda=\Delta n\times$helical pitch". Therefore, the width of the selective reflection range can be controlled by adjusting $\Delta n$. $\Delta n$ can be adjusted by adjusting a kind of a liquid crystal compound for forming the cholesteric liquid crystal layer and a mixing ratio thereof, and a temperature during alignment immobilization.

Accordingly, regarding the wavelength of light that is reflected (diffracted) by the liquid crystal layer 34, the selective reflection wavelength range of the liquid crystal layer 34 may be set, for example, by adjusting the helical pitch of the liquid crystal layer 34 according to each of the liquid crystal diffraction elements.

The half-width of the selective reflection wavelength range of the liquid crystal layer 34 is adjusted depending on the application of the image display apparatus 10 and is, for example, 10 to 500 nm and preferably 20 to 300 nm and more preferably 30 to 100 nm.

As shown in FIG. 3, in the X-Y plane of the liquid crystal layer 34, the liquid crystal compounds 40 are arranged along a plurality of arrangement axes D parallel to the X-Y plane. On each of the arrangement axes D, the direction of the optical axis 40A of the liquid crystal compound 40 changes while continuously rotating in the one in-plane direction along the arrangement axis D. Here, for the convenience of description, it is assumed that the arrangement axis D is directed to the X direction. In addition, in the Y direction, the liquid crystal compounds 40 in which the directions of the optical axes 40A are the same are arranged at regular intervals.

"The direction of the optical axis 40A of the liquid crystal compound 40 changes while continuously rotating in the one in-plane direction along the arrangement axis D" represents that angles between the optical axes 40A of the liquid crystal compounds 40 and the arrangement axes D vary depending on positions in the arrangement axis D direction and gradually change from $\theta$ to $\theta+180°$ or $\theta-180°$ along the arrangement axis D. That is, in each of the plurality of liquid crystal compounds 40 arranged along the arrangement axis D, as shown in FIG. 3, the optical axis 40A changes along the arrangement axis D while rotating on a given angle basis.

A difference between the angles of the optical axes 40A of the liquid crystal compounds 40 adjacent to each other in the arrangement axis D direction is preferably 45° or less, more preferably 15° or less, and still more preferably less than 15°.

In addition, in the present specification, in a case where the liquid crystal compound 40 is a rod-like liquid crystal compound, the optical axis 40A of the liquid crystal compound 40 refers to a molecular major axis of the rod-like liquid crystal compound. On the other hand, in a case where the liquid crystal compound 40 is a disk-like liquid crystal compound, the optical axis 40A of the liquid crystal compound 40 refers to an axis parallel to the normal direction (vertical direction) with respect to a disc plane of the disk-like liquid crystal compound.

In the liquid crystal layer 34, in the liquid crystal alignment pattern of the liquid crystal compound 40, the length (distance) over which the optical axis 40A of the liquid crystal compound 40 rotates by 180° in the arrangement axis D direction in which the optical axis 40A changes while continuously rotating in a plane is the length $\Lambda$ of the single period in the liquid crystal alignment pattern.

That is, a distance between centers of two liquid crystal compounds 40 in the arrangement axis D direction is the length $\Lambda$ of the single period, the two liquid crystal compounds having the same angle in the arrangement axis D direction. Specifically, as shown in FIG. 3, a distance between centers in the arrangement axis D direction of two liquid crystal compounds 40 in which the arrangement axis D direction and the direction of the optical axis 40A match each other is the length $\Lambda$ of the single period. In the following description, the length $\Lambda$ of the single period will also be referred to as "single period $\Lambda$".

In the liquid crystal alignment pattern of the liquid crystal layer 34, the single period $\Lambda$ is repeated in the arrangement axis D direction, that is, in the one in-plane direction in which the direction of the optical axis 40A changes while continuously rotating. In the polarization diffraction element, the single period Λ is the period (single period) of the diffraction structure. In addition, the liquid crystal layer 34 has the region in which the single period Λ decreases in the direction away from the display element 12.

On the other hand, in the liquid crystal compound 40 forming the liquid crystal layer 34, the directions of the optical axes 40A are the same in the direction (in FIG. 3, the Y direction) perpendicular to the arrangement axis D direction, that is, the Y direction perpendicular to the one in-plane direction in which the optical axis 40A continuously rotates.

In other words, in the liquid crystal compound 40 forming the liquid crystal layer 34, angles between the optical axes 40A of the liquid crystal compound 40 and the arrangement axis D (X direction) are the same in the Y direction.

Figure 4:
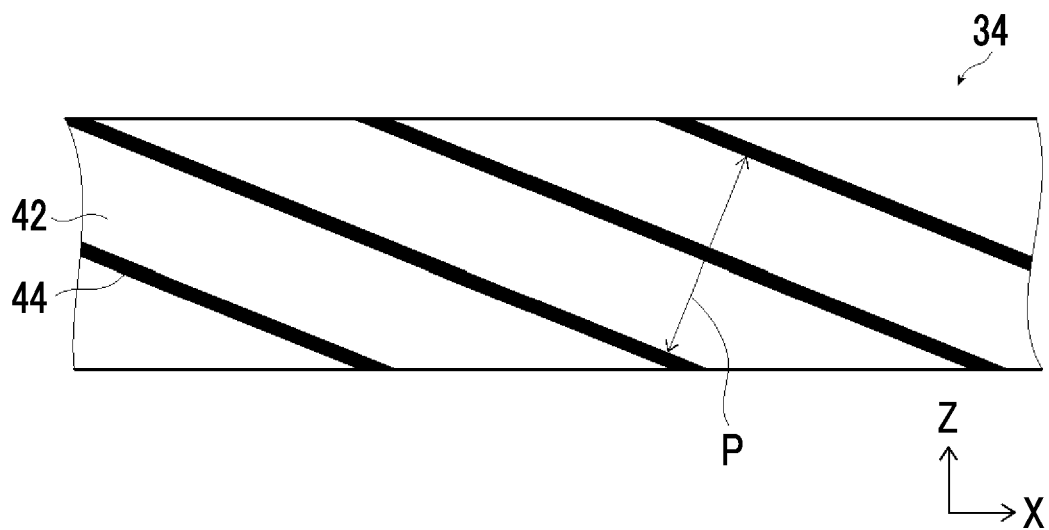
FIG. 4 is a diagram conceptually showing a scanning electron microscope image of a cross section of the cholesteric liquid crystal layer shown in FIG. 3.

In a case where a cross section of the liquid crystal layer 34 shown in FIG. 2 in the X-Z direction is observed with a scanning electron microscope (SEM), an arrangement direction in which bright portions 42 and dark portions 44 are alternately arranged as shown in FIG. 4, a stripe pattern tilted at a predetermined angle with respect to the main surface (X-Y plane) is observed.

Basically, the interval of the bright portions 42 and the dark portions 44, that is, the surface pitch P depends on the helical pitch of the cholesteric liquid crystal layer.

Accordingly, the wavelength range of light that is selectively reflected by the cholesteric liquid crystal layer correlates to the interval of the bright portions 42 and the dark portions 44, that is, the surface pitch P. That is, as the surface pitch P increases, the helical pitch increases. Therefore, the wavelength range of light that is selectively reflected by the cholesteric liquid crystal layer increases. Conversely, as the surface pitch P decreases, the helical pitch decreases. Therefore, the wavelength range of light that is selectively reflected by the cholesteric liquid crystal layer decreases.

Here, in the cholesteric liquid crystal layer, basically, a structure in which the bright portion 42 and the dark portion 44 are repeated twice corresponds to the helical pitch. Accordingly, in the cross section observed with a SEM, an interval between the bright portions 42 adjacent to each other or between the dark portions 44 adjacent to each other in a normal direction (vertical direction) of lines formed by the bright portions 42 or the dark portions 44 corresponds to a ½ pitch of the surface pitch P.

That is, the surface pitch P may be measured by setting the interval between the bright portions 42 or between the dark portions 44 in the normal direction with respect to the lines as a ½ pitch.

In the liquid crystal layer 34 having the liquid crystal alignment pattern as in the example shown in the drawing, as described above, the bright portions 42 and the dark portions 44 are tilted at a predetermined angle with respect to the main surface. Therefore, in the following description, the surface pitch P of the liquid crystal layer 34 having the liquid crystal alignment pattern will also be referred to as the tilted surface pitch P.

Hereinafter, an action of diffraction of the liquid crystal layer 34 will be described.

In a cholesteric liquid crystal layer of the related art, a helical axis derived from a cholesteric liquid crystalline phase is perpendicular to the main surface (X-Y plane), and a reflecting surface thereof is parallel to the main surface (X-Y plane). In addition, the optical axis of the liquid crystal compound is not tilted with respect to the main surface (X-Y plane). In other words, the optical axis is parallel to the main surface (X-Y plane). Accordingly, in a case where the X-Z plane of the cholesteric liquid crystal layer in the related art is observed with a SEM, an arrangement direction in which bright portions and dark portions are alternately arranged is perpendicular to the main surface (X-Y plane).

The cholesteric liquid crystalline phase has specular reflectivity. Therefore, in a case where light is incident from the normal direction into the cholesteric liquid crystal layer, the light is reflected in the normal direction.

Figure 5:
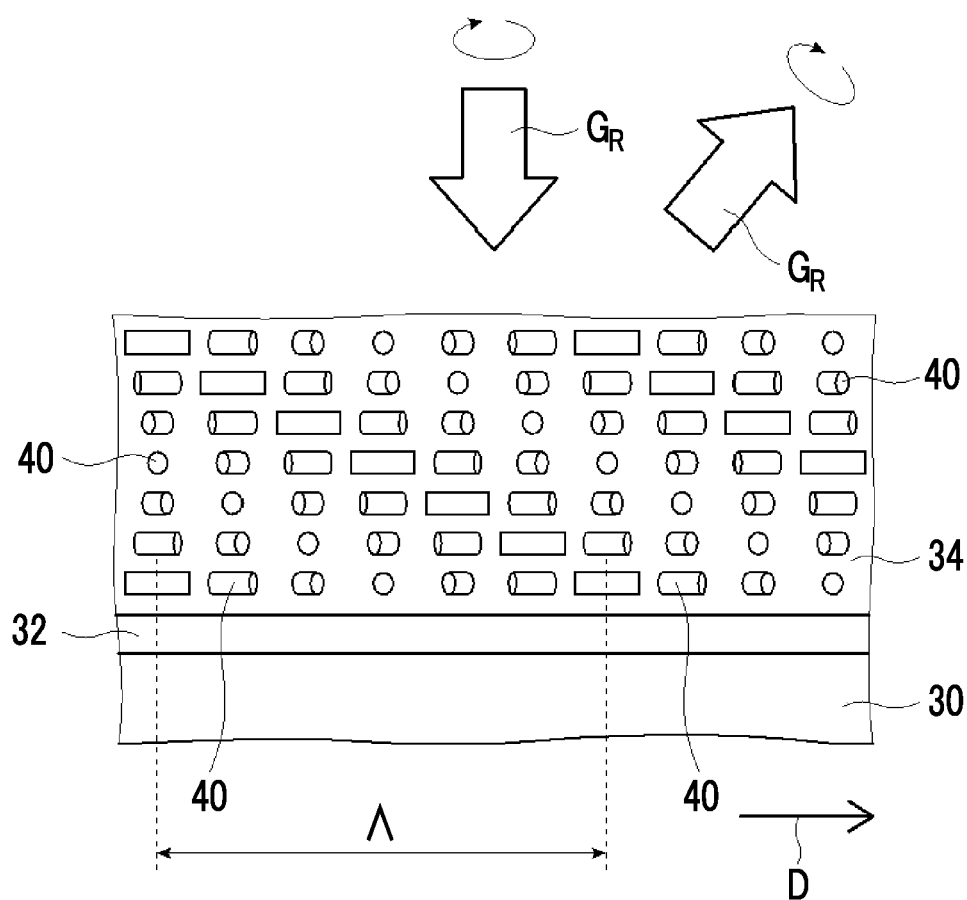
FIG. 5 is a conceptual diagram showing an action of the cholesteric liquid crystal layer shown in FIG. 3.

On the other hand, the liquid crystal layer 34 reflects incident light in a state where it is tilted in the arrangement axis D direction with respect to the specular reflection. The liquid crystal layer 34 has the liquid crystal alignment pattern in which the optical axis 40A changes while continuously rotating in the arrangement axis D direction in a plane (the predetermined one in-plane direction). Hereinafter, the description will be made with reference to FIG. 5.

As described above, the liquid crystal layer 34 is a cholesteric liquid crystal layer that selectively reflects right circularly polarized light $G_R$ of green light. Accordingly, in a case where light is incident into the liquid crystal layer 34, the liquid crystal layer 34 reflects only right circularly polarized light $G_R$ of green light and allows transmission of the other light.

Here, in the liquid crystal layer 34, the optical axis 40A of the liquid crystal compound 40 changes while rotating in the arrangement axis D direction (the one in-plane direction).

The liquid crystal alignment pattern formed in the liquid crystal layer 34 is a pattern that is periodic in the arrangement axis D direction. Therefore, as conceptually shown in FIG. 5, the right circularly polarized light $G_R$ of green light incident into the liquid crystal layer 34 is reflected (diffracted) in a direction corresponding to the period of the liquid crystal alignment pattern, and the reflected right circularly polarized light $R_R$ of red light is reflected (diffracted) in a direction tilted with respect to the XY plane (the main surface of the cholesteric liquid crystal layer) in the arrangement axis D direction.

In the liquid crystal layer 34, by appropriately setting the arrangement axis D direction as the one in-plane direction in which the optical axis 40A rotates, the reflection direction (diffraction angle) of light can be adjusted.

In addition, in a case where circularly polarized light having the same wavelength and the same turning direction is reflected, by reversing the rotation direction of the optical axis 40A of the liquid crystal compound 40 toward the arrangement axis D direction, a reflection direction of the circularly polarized light can be reversed.

That is, in FIGS. 2 and 3, the rotation direction of the optical axis 40A toward the arrangement axis D direction is clockwise, and one circularly polarized light is reflected in a state where it is tilted in the arrangement axis D direction. By setting the rotation direction of the optical axis 40A to be counterclockwise, the circularly polarized light is reflected in a state where it is tilted in a direction opposite to the arrangement axis D direction.

Further, in the liquid crystal layer having the same liquid crystal alignment pattern, the reflection direction is reversed by adjusting the helical turning direction of the liquid crystal compound 40, that is, the turning direction of circularly polarized light to be reflected.

For example, in a case where the helical turning direction of the liquid crystal layer is right-twisted, the liquid crystal layer selectively reflects right circularly polarized light, and has the liquid crystal alignment pattern in which the optical axis 40A rotates clockwise in the arrangement axis D direction. As a result, the right circularly polarized light is reflected in a state where it is tilted in the arrangement axis D direction.

In addition, for example, in a case where the helical turning direction of the liquid crystal layer is left-twisted, the liquid crystal layer selectively reflects left circularly polarized light, and has the liquid crystal alignment pattern in which the optical axis 40A rotates clockwise in the arrangement axis D direction. As a result, the left circularly polarized light is reflected in a state where it is tilted in a direction opposite to the arrangement axis D direction.

Accordingly, in the polarization diffraction element 18, the arrangement axis D direction of the liquid crystal layer 34 and the rotation direction of the optical axis 40A in the liquid crystal alignment pattern are set such that incident light is appropriately directed to the observation position by the user U.

As described above, in the liquid crystal layer 34 (polarization diffraction element 18) that acts as a reflective polarization diffraction element, in the liquid crystal alignment pattern of the liquid crystal compound 40, the single period Λ as the length over which the optical axis 40A of the liquid crystal compound 40 rotates by 180° is the period (single period) of the diffraction structure. In addition, in the liquid crystal layer 34, the one in-plane direction (arrangement axis D direction) in which the optical axis 40A of the liquid crystal compound 40 changes while rotating is the periodic direction of the diffraction structure.

In the liquid crystal layer having the liquid crystal alignment pattern, as the single period Λ decreases, the diffraction angle of reflected light with respect to the incidence light increases. That is, as the single period Λ decreases, incidence light can be largely diffracted to be reflected in a direction that is largely different from specular reflection.

Figure 6:
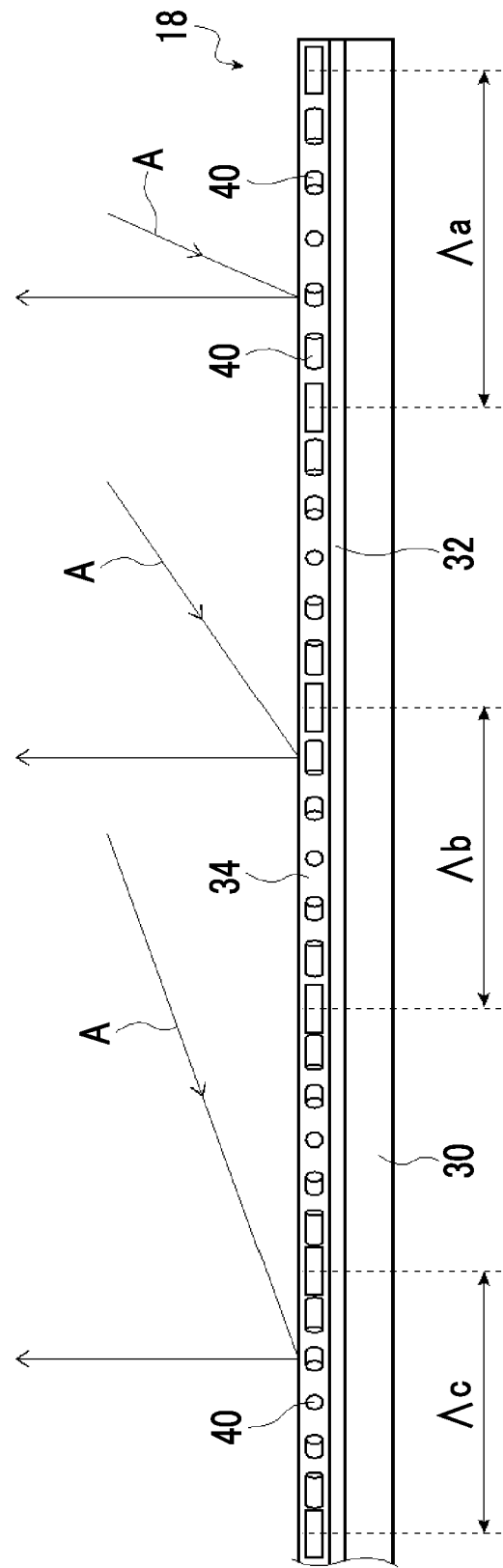
FIG. 6 is a conceptual diagram showing an action of the cholesteric liquid crystal layer shown in FIG. 3.

In the image display apparatus 10 according to the embodiment of the present invention, as conceptually shown in FIG. 6, the liquid crystal layer 34 of the polarization diffraction element 18 has the region in which the single period Λ gradually decreases in the direction away from the display element 12.

Although described below, in the image display apparatus 10 according to the embodiment of the present invention that displays augmented reality, the virtual image A displayed by the display element 12 is reflected by the polarization diffraction element such as the (cholesteric) liquid crystal layer 34 and is emitted to the observation position by the user U. As a result, the brightness of the real scene R can be increased.

Here, as shown in FIG. 1, the incidence angle of the virtual image A incident from the display element 12 into the polarization diffraction element 18 (liquid crystal layer 34) varies depending on positions of the polarization diffraction element 18. In the present invention, the incidence angle of the virtual image A refers to an angle between the normal line (line perpendicular to the main surface) of the polarization diffraction element 18 and the virtual image A incident into the polarization diffraction element 18. For example, in an upper end portion of the polarization diffraction element 18 in the drawing, the incidence angle of the virtual image A is more than that of in a lower end portion thereof.

Accordingly, in order to appropriately emit the virtual image A reflected (diffracted) by the polarization diffraction element 18 to the observation position by the user U, the diffraction angle of the virtual image A in the lower end portion of the polarization diffraction element 18 in the drawing needs to be more than that of the upper end portion thereof.

On the other hand, as conceptually shown in FIG. 6, the image display apparatus 10 according to the embodiment of the present invention has the region in which the single period Λ in the liquid crystal alignment pattern of the liquid crystal layer 34 corresponding to the period of the diffraction structure of the diffraction element decreases in the direction away from the display element 12.

Specifically, assuming that the display element 12 is positioned on the right side in FIG. 6, the incidence angle of the virtual image A increases in a direction from the right side to the left side in the drawing that is the direction away from the display element 12. Accordingly, the single period Λ in the liquid crystal alignment pattern of the liquid crystal layer 34 gradually decreases in a direction from the right side to the left side in the drawing that is the direction away from the display element 12, for example, a single period Λa, a single period Λb, a single period Λc, and . . . .

The distance from the display element 12 can be determined based on the distance from a position where the display element 12 projects the virtual image A to a plane of the polarization diffraction element 18 in an in-plane direction.

That is, in a region having a small incidence angle that is close to the display element 12, assuming that the single period Λ of the liquid crystal alignment pattern is the single period Λa, the virtual image A is diffracted and reflected.

On the other hand, in a region having a larger incidence angle that is spaced from the display element 12, assuming that the single period Λ of the liquid crystal alignment pattern is the single period Λb shorter than the single period Λa, the virtual image A is reflected at a larger diffraction angle.

In a region having a much larger incidence angle that is more spaced from the display element 12, assuming that the single period Λ of the liquid crystal alignment pattern is the single period Λc shorter than the single period Λb, the virtual image A is reflected at a much larger diffraction angle.

As a result, the virtual image A can be appropriately emitted to the observation position by the user U in the entire area of the polarization diffraction element 18 irrespective of the distance of the polarization diffraction element 18 from the display element 12, that is, the incidence angle.

The degree to which the single period Λ of the liquid crystal alignment pattern of the liquid crystal layer 34 decreases in the direction away from the display element 12 is not limited, and the single period Λ corresponding to the position of the liquid crystal layer 34 may be appropriately set depending on the positional relationship between the display element 12 and the polarization diffraction element 18, the wavelength of light as the virtual image A, the observation position of the virtual image A by the user U, and the like such that the virtual image A can be emitted to the observation position by the user U in the entire incidence region of the virtual image A in the polarization diffraction element 18.

In the image display apparatus 10 according to the embodiment of the present invention, the single period Λ of the liquid crystal alignment pattern of the liquid crystal layer 34 may decrease continuously or stepwise in the direction away from the display element 12, or a region where the single period Λ decreases continuously and a region where the single period Λ decreases stepwise may be mixed. In addition, the single period Λ of the liquid crystal alignment pattern of the liquid crystal layer 34 may decrease intermittently.

In addition, in the entire area of the liquid crystal layer 34 in the arrangement axis D direction, for example, the single period Λ of the liquid crystal alignment pattern decreases in the direction away from the display element 12. Alternatively, in a region of the liquid crystal layer 34 other than a part on one end side in the arrangement axis D direction, the single period Λ of the liquid crystal alignment pattern may decrease in the direction away from the display element 12. Alternatively, in a region of the liquid crystal layer 34 other than a part on both end sides in the arrangement axis D direction, the single period Λ of the liquid crystal alignment pattern may decrease in the direction away from the display element 12.

That is, in the image display apparatus 10 according to the embodiment of the present invention, as long as the liquid crystal layer 34 can appropriately reflect the virtual image A incident from the display element 12 to the observation position by the user U, the single period Λ of the liquid crystal alignment pattern may decrease in the direction away from the display element 12 in any region in the arrangement axis D direction.

In the image display apparatus 10 according to the embodiment of the present invention, the single period Λ of the liquid crystal layer 34 is not particularly limited and may be appropriately set such that the virtual image A incident into the polarization diffraction element 18 (liquid crystal layer 34) can be appropriately reflected to the observation position by the user U.

The single period Λ of the liquid crystal layer 34 is preferably 0.1 to 20 µm and more preferably 0.1 to 10 µm. It is preferable that the single period Λ of the liquid crystal layer 34 is appropriately set depending on the wavelength λ of incident light.

In the example shown in FIG. 2, a configuration in which, on the X-Z plane of the liquid crystal layer 34, the optical axes 40A of the liquid crystal compound 40 is aligned to be parallel with respect to the main surface (X-Y plane) is adopted.

However, the present invention is not limited to this configuration. For example, as conceptually shown in FIG. 7, a configuration in which, on the X-Z plane of the liquid crystal layer 34, the optical axes 40A of the liquid crystal compound 40 is aligned to be tilted with respect to the main surface (X-Y plane) may be adopted.

Figure 7:
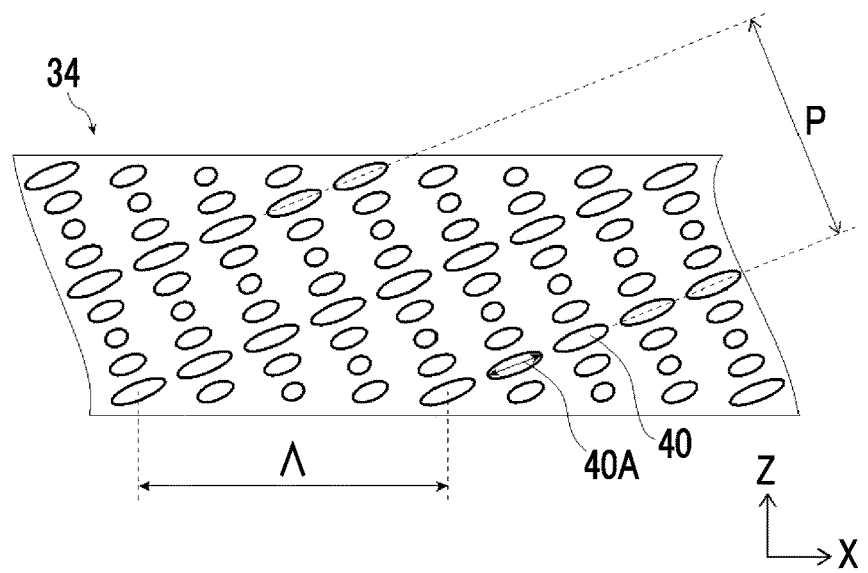
FIG. 7 is a diagram conceptually showing still another example of the cholesteric liquid crystal layer.

In addition, the example shown in FIG. 7 shows the configuration in which, on the X-Z plane of the liquid crystal layer 34, the tilt angle of the liquid crystal compound 40 with respect to the main surface (X-Y plane) is uniform in the thickness direction (Z direction). However, the present invention is not limited to this configuration. In the liquid crystal layer 34, a region where the tilt angle of the liquid crystal compound 40 varies in the thickness direction may be provided.

Figure 8:
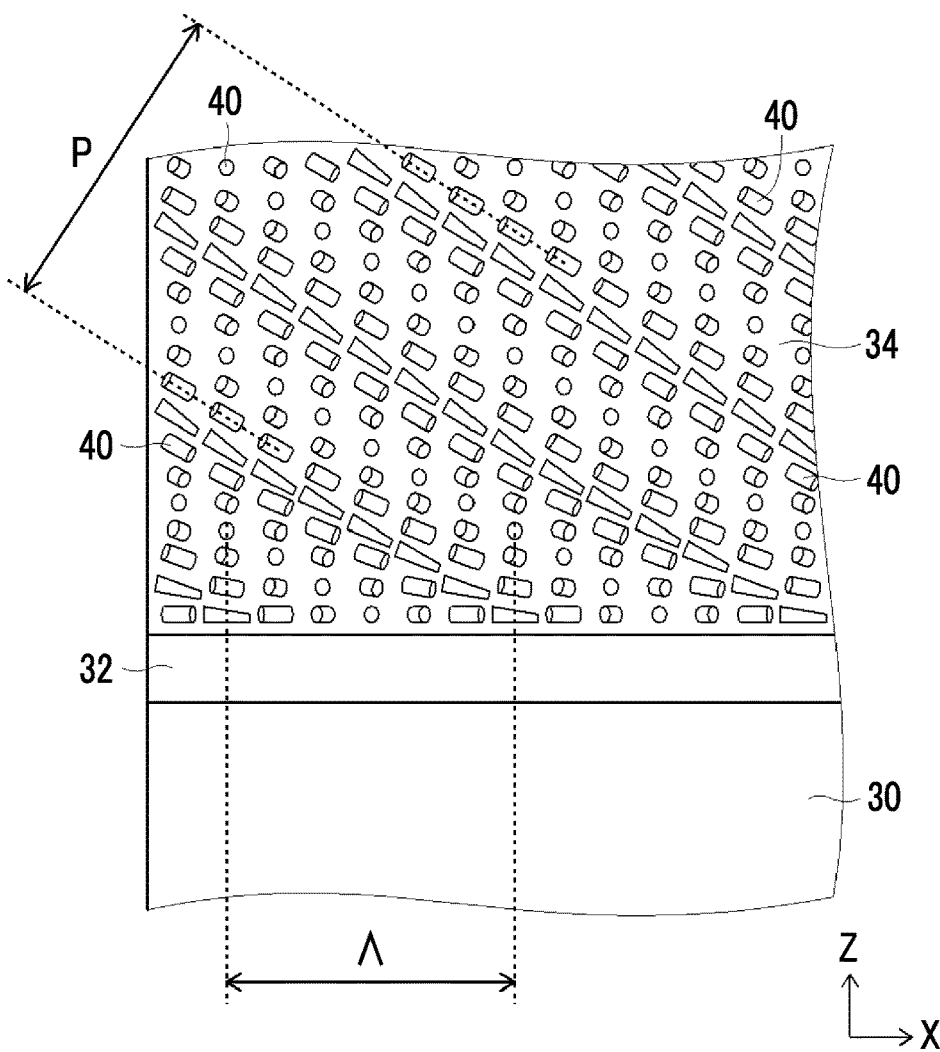
FIG. 8 is a diagram conceptually showing still another example of the cholesteric liquid crystal layer.

For example, in an example shown in FIG. 8, the optical axis 40A of the liquid crystal compound 40 at an interface of the liquid crystal layer on the alignment film 32 side is parallel to the main surface (the pretilt angle is 0°), the tilt angle of the liquid crystal compound 40 increases in a direction away from the interface on the alignment film 32 side to the thickness direction, and the liquid crystal compound is aligned at a given tilt angle on another interface (air interface).

This way, the liquid crystal layer 34 may have a configuration in which the optical axis of the liquid crystal compound has a pretilt angle at one interface among the upper and lower interfaces or may have a pretilt angle at both of the interfaces. In addition, the pretilt angles at both of the interfaces may be different from each other.

The liquid crystal compound has the tilt angle (is tilted). As a result, in a case where light is diffracted, the effective birefringence index of the liquid crystal compound increases, and the diffraction efficiency can be improved.

The average angle (average tilt angle) between the optical axis 40A of the liquid crystal compound 40 and the main surface (X-Y plane) is preferably 5° to 80° and more preferably 10° to 50°. The average tilt angle can be measured by observing the X-Z plane of the liquid crystal layer 34 with a polarization microscope. In particular, it is preferable that, on the X-Z plane of the liquid crystal layer 34, the optical axis 40A of the liquid crystal compound 40 is aligned to be tilted with respect to the main surface (X-Y plane) in the same direction.

In a case where the cross-section of the cholesteric liquid crystal layer is observed with a polarization microscope, the tilt angle is a value obtained by measuring the angle between the optical axis 40A of the liquid crystal compound 40 and the main surface at any five or more positions and obtaining the average value thereof.

Light that is vertically incident into the liquid crystal layer 34 (diffraction element) travels obliquely in an oblique direction in the liquid crystal layer along with a bending force. In a case where light travels in the liquid crystal layer, diffraction loss is generated due to a deviation from conditions such as a diffraction period that are set to obtain a desired diffraction angle with respect to the vertically incident light.

In a case where the liquid crystal compound is tilted, an orientation in which a higher birefringence index is generated than that in an orientation in which light is diffracted as compared to a case where the liquid crystal compound is not tilted is present. In this direction, the effective extraordinary light refractive index increases, and thus the birefringence index as a difference between the extraordinary light refractive index and the ordinary light refractive index increases.

By setting the orientation of the tilt angle according to the desired diffraction orientation, a deviation from the original diffraction conditions in the orientation can be suppressed. As a result, it is presumed that, in a case where the liquid crystal compound having a tilt angle is used, a higher diffraction efficiency can be obtained.

In addition, it is preferable that the tilt angle is controlled by treating the interface of the liquid crystal layer 34.

By pretilting the alignment film on the support side interface, the tilt angle of the liquid crystal compound can be controlled. For example, by exposing the alignment film to ultraviolet light from the front and subsequently obliquely exposing the alignment film during the formation of the alignment film, the liquid crystal compound in the liquid crystal layer formed on the alignment film can be made to have a pretilt angle. In this case, the liquid crystal compound is pretilted in a direction in which the single axis side of the liquid crystal compound can be seen with respect to the second irradiation direction. Since the liquid crystal compound having an orientation in a direction perpendicular to the second irradiation direction is not pretilted, a region where the liquid crystal compound is pretilted and a region where the liquid crystal compound is not pretilted are present in a plane. This configuration is suitable for improving the diffraction efficiency because it contributes to the most improvement of birefringence in the desired direction in a case where light is diffracted in the direction.

Further, an additive for promoting the pretilt angle can also be added to the liquid crystal layer or to the alignment film. In this case, the additive can be used as a factor for further improving the diffraction efficiency.

This additive can also be used for controlling the pretilt angle on the air side interface.

Here, in a cross section of the liquid crystal layer 34 observed with a SEM, the bright portions and the dark portions derived from a cholesteric liquid crystalline phase are tilted with respect to the main surface.

In the liquid crystal layer, it is preferable that, in a case where an in-plane retardation Re is measured from a normal direction and a direction tilted with respect to a normal line, a direction in which the in-plane retardation Re is the minimum in any one of a slow axis plane or a fast axis plane is tilted from the normal direction. Specifically, it is preferable that an absolute value of the measured angle between the direction in which the in-plane retardation Re is the minimum and the normal line is 5° or more. In other words, it is preferable that the liquid crystal compound of the liquid crystal layer is tilted with respect to the main surface and the tilt direction substantially matches the bright portions and the dark portions of the liquid crystal layer. The normal direction is a direction perpendicular to the main surface.

By the liquid crystal layer having the above-described configuration, circularly polarized light can be diffracted with a higher diffraction efficiency than the liquid crystal layer in which the liquid crystal compound is parallel to the main surface.

In the configuration in which the liquid crystal compound of the liquid crystal layer is tilted with respect to the main surface and the tilt direction substantially matches the bright portions and the dark portions, bright portions and dark portions corresponding to a reflecting surface matches the optical axis of the liquid crystal compound. Therefore, the action of the liquid crystal compound on light reflection (diffraction) increases, the diffraction efficiency can be improved. As a result, the amount of reflected light with respect to incidence light can be further improved.

In the fast axis plane or the slow axis plane of the liquid crystal layer, the absolute value of the tilt angle of the optical axis of the liquid crystal layer is preferably 5° or more, more preferably 15° or more, and still more preferably 20° or more.

It is preferable that the absolute value of the tilt angle of the optical axis is 15° or more from the viewpoint that the direction of the liquid crystal compound matches the bright portions and the dark portions more suitably such that the diffraction efficiency can be improved.

Method of Forming Liquid Crystal Layer

The liquid crystal layer 34 can be formed by immobilizing a liquid crystal phase in a layer shape, the liquid crystal phase obtained by aligning the liquid crystal compound 40 in a predetermined alignment state. For example, the cholesteric liquid crystal layer can be formed by immobilizing a cholesteric liquid crystalline phase in a layer shape.

The structure in which a cholesteric liquid crystalline phase is immobilized may be a structure in which the alignment of the liquid crystal compound as a liquid crystal phase is immobilized. Typically, it is preferable that the structure in which a predetermined liquid crystal phase is immobilized is a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a liquid crystal phase is immobilized is not particularly limited as long as the optical characteristics of the liquid crystal phase are maintained, and the liquid crystal compound 40 in the liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the liquid crystal layer include a liquid crystal composition including a liquid crystal compound. It is preferable that the liquid crystal compound is a polymerizable liquid crystal compound.

In addition, the liquid crystal composition used for forming the liquid crystal layer may further include a surfactant and a chiral agent.

Polymerizable Liquid Crystal Compound

The polymerizable liquid crystal compound may be a rod-like liquid crystal compound or a disk-like liquid crystal compound.

Examples of the rod-like polymerizable liquid crystal compound include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/022586A, WO95/024455A, WO97/000600A, WO98/023580A, WO98/052905A, JP1989-272551A (JP-H1-272551A), JP1994-016616A (JP-H6-016616A), JP1995-110469A (JP-H7-110469A), JP1999-080081A (JP-H11-080081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

Disk-Like Liquid Crystal Compound

As the disk-like liquid crystal compound, for example, compounds described in JP2007-108732A and JP2010-244038A can be preferably used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

Surfactant

The liquid crystal composition used for forming the liquid crystal layer may include a surfactant.

It is preferable that the surfactant is a compound that can function as an alignment control agent contributing to the stable or rapid alignment of a cholesteric liquid crystalline phase. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

Chiral Agent (Optically Active Compound)

The chiral agent has a function of causing a helical structure of a cholesteric liquid crystalline phase to be formed. The chiral agent may be selected depending on the purpose because a helical twisted direction or a helical pitch (that is, a tilted surface pitch) derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

Polymerization Initiator

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

Crosslinking Agent

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate]4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a liquid crystal phase is further improved.

Other Additives

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

In a case where the liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. Among these crosslinking agents, one kind may be used alone, or two or more kinds may be used in combination. Among these, a ketone is preferable in consideration of an environmental burden.

In a case where the liquid crystal layer 34 is formed, it is preferable that the liquid crystal layer 34 is formed by applying the liquid crystal composition to a surface where the liquid crystal layer 34 is to be formed, aligning the liquid crystal compound 40 to a state of a desired liquid crystal phase, and curing the liquid crystal compound 40.

That is, in a case where the cholesteric liquid crystal layer is formed on the alignment film 32, it is preferable that the liquid crystal layer 34 obtained by immobilizing a cholesteric liquid crystalline phase is formed by applying the liquid crystal composition to the alignment film 32, aligning the liquid crystal compound 40 to a state of a cholesteric liquid crystalline phase, and curing the liquid crystal compound 40.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the liquid crystal layer. In the drying and/or heating step, the liquid crystal compound 40 in the liquid crystal composition may be aligned to a cholesteric liquid crystalline phase. In the case of heating, the heating temperature is preferably 200° C. or lower and more preferably 130° C. or lower.

The aligned liquid crystal compound 40 is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

The thickness of the liquid crystal layer 34 is not particularly limited, and the thickness with which a required light reflectivity can be obtained may be appropriately set depending on the use of the diffraction element, the light reflectivity required for the liquid crystal layer 34, the material for forming the liquid crystal layer 34, and the like.

In the image display apparatus 10 according to the embodiment of the present invention, the wavelength range of the light that is selectively reflected by the (cholesteric) liquid crystal layer 34 of the polarization diffraction element 18 is not particularly limited and may be appropriately set depending on the use of the image display apparatus and the like.

That is, the liquid crystal layer 34 in the example shown in the drawing selectively reflects green light, but the present invention is not limited thereto. In the polarization diffraction element 18, the liquid crystal layer 34 that acts as a reflective polarization diffraction element may selectively reflect red light or may selectively reflect blue light.

In addition, the polarization diffraction element 18 in the example shown in the drawing includes one liquid crystal layer 34, but the present invention is not limited thereto. The polarization diffraction element 18 may include a plurality of liquid crystal layers 34 in which the tilted surface pitches P, that is, the selectively reflection wavelength ranges are different from each other.

For example, the polarization diffraction element 18 may include the two liquid crystal layers 34 including the liquid crystal layer 34 that selectively reflects red light and the liquid crystal layer 34 that selectively reflects green light. Alternatively, the polarization diffraction element 18 may include the two liquid crystal layers 34 including the liquid crystal layer 34 that selectively reflects green light and the liquid crystal layer 34 that selectively reflects blue light. Further, the polarization diffraction element 18 may include the three liquid crystal layers 34 including the liquid crystal layer 34 that selectively reflects red light, the liquid crystal layer 34 that selectively reflects green light, and the liquid crystal layer 34 that selectively reflects blue light.

In a case where the polarization diffraction element 18 includes a plurality of liquid crystal layers 34, it is preferable that a display element that displays an image using two colors or a full color image using three colors is also used as the display element 12.

In other words, in a case where the display element 12 displays an image using two colors or a full color image using three colors, it is preferable that the polarization diffraction element 18 includes two or three liquid crystal layers 34.

Here, as described above, in the liquid crystal layer 34 having the liquid crystal alignment pattern, as the single period Λ decreases, the diffraction angle of reflected light with respect to the incidence light increases. That is, in the liquid crystal layer 34, as the single period Λ decreases, reflected light can be largely diffracted with respect to incidence light to be reflected in a direction that is different from specular reflection.

In addition, in the liquid crystal layer 34 having the liquid crystal alignment pattern, the reflection angle (diffraction angle) of light varies depending on the wavelength of light that is selectively reflected, that is, the tilted surface pitch P (helical pitch). Specifically, in the liquid crystal layer 34, as the tilted surface pitch P increases, that is, as the wavelength of light increases, the diffraction angle of reflected light with respect to incidence light increases.

In consideration of this point, in the image display apparatus 10 according to the embodiment of the present invention, in a case where the polarization diffraction element 18 includes a plurality of liquid crystal layers 34 in which the tilted surface pitches P are different from each other, it is preferable that a permutation of the tilted surface pitches P of the liquid crystal layers and a permutation of the single periods Λ match each other.

For example, it is assumed that the polarization diffraction element 18 includes the three liquid crystal layers 34 including the liquid crystal layer 34 that selectively reflects red light, the liquid crystal layer 34 that selectively reflects green light, and the liquid crystal layer 34 that selectively reflects blue light.

In this case, the tilted surface pitch P of the liquid crystal layer 34 that selectively reflects red light is the longest, the tilted surface pitch P of the liquid crystal layer 34 that selectively reflects green light is the second longest, and the tilted surface pitch P of the liquid crystal layer 34 that selectively reflects blue light is the shortest.

Accordingly, in this case, regarding the single period Λ in the liquid crystal alignment pattern of each of the liquid crystal layers 34, it is preferable that the single period Λ of the liquid crystal layer 34 having the longest tilted surface pitch P that selectively reflects red light is the longest, the single period Λ of the liquid crystal layer 34 having the second longest tilted surface pitch P that selectively reflects green light is the second longest, and the single period Λ of the liquid crystal layer 34 having the shortest tilted surface pitch P that selectively reflects blue light is the shortest. The single period Λ in the liquid crystal alignment pattern of each of the liquid crystal layers 34 is the average value.

With the above-described configuration, the reflection directions of the virtual images A of the colors that are reflected by the polarization diffraction element 18 to the observation position by the user U can be made to be the same.

As a result, a color image having no color shift can be emitted to the observation position by the user U as the virtual image A.

In a case where the polarization diffraction element 18 includes a plurality of liquid crystal layers in which the tilted surface pitches P, that is, the selectively reflection wavelength ranges are different from each other, turning directions of circularly polarized light to be reflected by the respective liquid crystal layers may be the same as or different from each other.

However, in a case where the polarization diffraction element 18 includes a plurality of liquid crystal layers 34 in which the tilted surface pitches P are different from each other, it is preferable that turning directions of circularly polarized light to be selectively reflected by the liquid crystal layers 34 adjacent to each other are opposite to each other.

For example, it is assumed that the polarization diffraction element 18 include the two liquid crystal layers 34 including the liquid crystal layer 34 that selectively reflects green light and the liquid crystal layer 34 that selectively reflects red light. In this case, red light may be incident into and reflected by the liquid crystal layer 34 that selectively reflects green light, and green light may be incident into and reflected by the liquid crystal layer 34 that selectively reflects red light. This phenomenon is likely to occur in particular in the liquid crystal layers 34 where the selective reflection wavelength ranges are adjacent to each other.

In the liquid crystal layers 34 in which the tilted surface pitches P are different from each other as described above, it is preferable that the single periods Λ of the liquid crystal alignment patterns are different from each other. In addition, in the liquid crystal layers 34 in which the single periods Λ are different, the diffraction angles are different.

Accordingly, in this case, in a case where red light is reflected by the liquid crystal layer 34 that selectively reflects green light, red light is reflected in a direction different from a direction in which the red light should be originally reflected. Likewise, in a case where green light is reflected by the liquid crystal layer 34 that selectively reflects red light, green light is reflected in a direction different from a direction in which the green light should be originally reflected.

In this case, the red light and/or the green light is reflected to an inappropriate position different from an appropriate position of the observation position by the user U such that double images occur.

On the other hand, in the liquid crystal layers 34 adjacent to each other in which the tilted surface pitches P are different from each other, turning directions of circularly polarized light to be selectively reflected are opposite to each other. As a result, even in a case where green light is incident into the liquid crystal layer 34 that selectively reflects red light, the green light is not reflected.

Accordingly, in a case where the polarization diffraction element 18 includes a plurality of liquid crystal layers 34 in which the tilted surface pitches P are different from each other, it is preferable that turning directions of circularly polarized light to be selectively reflected by the liquid crystal layers 34 adjacent to each other are opposite to each other. As a result, the occurrence of double images can be prevented.

In the (cholesteric) liquid crystal layer 34 shown in FIGS. 2 to 8, the tilted surface pitch P is uniform.

On the other hand, in the image display apparatus 10 according to the embodiment of the present invention, it is preferable that the liquid crystal layer 34 in the polarization diffraction element 18 has a pitch gradient structure that is a structure having a region where the tilted surface pitch P changes in a thickness direction.

In the following description, in the liquid crystal layer 34, the pitch gradient structure having the region in which the tilted surface pitch P changes in the thickness direction will also be referred to as "PG structure".

For example, the liquid crystal layer 34 has the PG structure in which the tilted surface pitch P gradually increases in a direction away from the support 30. In this case, the interval of the bright portions 42 and the dark portions 44 in the image obtained by observing the cross section of the liquid crystal layer 34 with a SEM gradually increases in the direction away from the support 30.

Hereinafter, for convenience's sake, the support 30 side will also be referred to as "lower side", and the side opposite to the support 30 will also be referred to as "upper side".

As described above, the selective reflection wavelength by the cholesteric liquid crystalline phase depends on the tilted surface pitch P (helical pitch), and as the tilted surface pitch P increases, the wavelength of light to be selectively reflected increases.

Accordingly, in this case, in the liquid crystal layer 34, light having a shorter wavelength is selectively reflected from the lower side, and the wavelength of light that is selectively reflected gradually increases toward the upper side. That is, by using the cholesteric liquid crystal layer having the PG structure in which the tilted surface pitch P changes in the thickness direction, light in a wide wavelength range can be selectively reflected.

By the liquid crystal layer 34 having the PG structure, the brightness uniformity of the virtual image A can be improved.

As is well known, in a case where light is incident into the (cholesteric) liquid crystal layer 34 from a direction having an angle with respect to the normal line, so-called blue shift (short wavelength shift) in which the selective reflection wavelength range is shifted to a shorter wavelength side occurs.

Accordingly, in a case where light incident into the liquid crystal layer 34 from an oblique direction, even light in a wavelength range that is originally reflected by the liquid crystal layer 34 according to the tilted surface pitch P is not reflected by the blue shift depending on the incidence angle with respect to the normal line.

In the image display apparatus such as AR glasses or a HUD that displays augmented reality in which the virtual image A is superimposed on the real scene R, the virtual image A needs to be incident into the polarization diffraction element 18, that is, the liquid crystal layer 34 from an oblique direction. Therefore, the image display apparatus that displays augmented reality using the liquid crystal layer 34 is largely affected by the blue shift.

In addition, in the image display apparatus that displays augmented reality using the liquid crystal layer 34, for example, in a case where the display element is a liquid crystal display, the incidence angle of light of the virtual image into the liquid crystal layer varies depending on positions in a display screen. In addition, in the case of a display using light scanning, the incidence angle of light of the virtual image into the liquid crystal layer varies depending on positions in a scanning direction.

Due to this reason, in the image display apparatus 10 that displays the virtual image using the liquid crystal layer 34, the reflectivity partially decreases due to the blue shift of the liquid crystal layer 34 such that the brightness of the virtual image A may partially decrease.

On the other hand, by the liquid crystal layer 34 having the PG structure, the selective reflection wavelength range of the liquid crystal layer 34 can be widened. In addition, even in a case where blue shift occurs due to oblique incidence, the virtual image A displayed by the display element 12 can be suitably reflected.

Therefore, by the liquid crystal layer 34 having the PG structure, the virtual image A having high brightness uniformity can be displayed.

The width of the selective reflection wavelength range of the liquid crystal layer 34 having the PG structure is not particularly limited and is preferably 150 nm or less in a case where the polarization diffraction element 18 includes a plurality of liquid crystal layers 34 in which the tilted surface pitches P are different and the single periods Λ of the liquid crystal alignment patterns are different.

By providing the PG structure, the reflection wavelength range of the liquid crystal layer 34 can be widened. However, in a case where the reflection wavelength range is excessively wide, light of a color that should not be originally reflected is reflected such that the image quality of the virtual image A may deteriorate. Examples of the light of a color that should not be originally reflected is reflected include incident external light and light corresponding to another liquid crystal layer 34 in a case where the polarization diffraction element 18 includes a plurality of liquid crystal layers 34 in which the tilted surface pitches P are different and the single periods Λ of the liquid crystal alignment patterns are different.

On the other hand, by setting the width of the selective reflection wavelength range of the liquid crystal layer 34 having the PG structure to be 150 nm or less, reflection of light of an unnecessary color by the liquid crystal layer 34 can be prevented.

On the other hand, in order to obtain the virtual image A having high brightness uniformity in a wide visual field range with respect to a single color, the width of the selective reflection wavelength range of the liquid crystal layer 34 having the PG structure is preferably 150 nm or more. By setting the selective reflection wavelength range of the liquid crystal layer 34 having the PG structure to be 150 nm or more, even in a case where blue shift occurs due to oblique incidence, the visual field range where the virtual image A displayed by the display element 12 can be suitably reflected can be widened.

The width of the selective reflection wavelength range of the liquid crystal layer 34 having the PG structure may be measured by disposing the light source (display element 12) oblique to the liquid crystal layer 34 assuming the disposition in the image display apparatus 10 and measuring light emitted from the light source and reflected by the liquid crystal layer 34 using a spectrophotometer. For example, the liquid crystal layer 34 may be disposed such that an angle between an emission direction of the light from the light source and the normal direction with respect to the main surface of the liquid crystal layer 34 is 50°.

In the image display apparatus 10 according to the embodiment of the present invention, in a case where the liquid crystal layer 34 has the PG structure, the tilted surface pitch P may change in the entire area of the liquid crystal layer 34 in the thickness direction or in a part of the liquid crystal layer 34 in the thickness direction.

That is, in the image display apparatus 10 according to the embodiment of the present invention, in a case where the liquid crystal layer 34 has the PG structure, the region where the tilted surface pitch P changes in the thickness direction is not limited as long as the liquid crystal layer 34 can selectively reflect light in a desired wavelength range.

In order to form the liquid crystal layer 34 having the PG structure, the chiral agent in which back isomerization, dimerization, isomerization, dimerization or the like occurs during light irradiation such that the helical twisting power (HTP) changes is used. By irradiating the liquid crystal composition with light having a wavelength at the HTP of the chiral agent changes before or during the curing of the liquid crystal composition for forming the cholesteric liquid crystal layer, the cholesteric liquid crystal layer having the PG structure can be formed.

For example, by using a chiral agent in which the HTP decreases during light irradiation, the HTP of the chiral agent decreases during light irradiation.

Here, the irradiated light is absorbed by a material for forming the cholesteric liquid crystal layer. Accordingly, for example, in a case where the light is irradiated from the upper side (the side opposite to the support 30), the irradiation dose of the light gradually decreases from the upper side to the lower side. That is, the amount of decrease in the HTP of the chiral agent gradually decreases from above to below. Therefore, on the upper side where the decrease in the HTP of the chiral agent is large, the induction of helix is small. As a result, the tilted surface pitch P (helical pitch) increases. Conversely, on the lower side where the decrease in HTP is small, helix is induced by the original HTP of the chiral agent, and thus the tilted surface pitch P decreases.

As the chiral agent used for forming the liquid crystal layer 34 having the PG structure, any well-known chiral agents can be used as long as the HTP thereof changes by light irradiation. A chiral agent having a molar absorption coefficient of 30000 or higher at a wavelength of 313 nm is preferably used.

As the chiral agent, a chiral agent having a cinnamoyl group is preferable. Examples of the chiral agent include compounds described in Liquid Crystal Device Handbook (No. 142 Committee of Japan Society for the Promotion of Science, 1989), Chapter 3, Article 4-3, chiral agent for TN or STN, p. 199), JP2003-287623A, JP2002-302487A, JP2002-080478A, JP2002-080851A, JP2010-181852A, and JP2014-034581A.

As the chiral agent, an isosorbide derivative, an isomannide derivative, or a binaphthyl derivative can be preferably used. As the isosorbide derivative, a commercially available product such as LC-756 (manufactured by BASF SE) may be used.

The liquid crystal layer 34 having the PG structure can be formed of a liquid crystal composition including a chiral agent of which the HTP changes by light irradiation using the same method as the above-described method.

Here, in a case where the liquid crystal layer 34 having the PG structure is formed, light irradiation for changing the HTP of the chiral agent is performed before the curing of the liquid crystal composition. Alternatively, in a case where the liquid crystal layer 34 having the PG structure is formed, light irradiation for changing the HTP of the chiral agent and light irradiation for curing the liquid crystal composition may be performed at the same time.

As described above, the PG structure can be obtained by irradiating the chiral agent with light having a wavelength that is absorbed by the chiral agent during the formation of the liquid crystal layer 34 such that the irradiation dose of light in the thickness direction, that is, the amount of change in HTP changes. Accordingly, as a difference in the irradiation dose of the light during the formation of the cholesteric liquid crystal layer increases in the thickness direction, the selective reflection wavelength range can be widened.

Action of Image Display Apparatus

Hereinafter, the present invention will be described in more detail by describing the action of the image display apparatus 10.

As described above, the display element 12 of the image display apparatus 10 displays (projects) an image of right circularly polarized light of green light as the virtual image A.

The virtual image A (image that forms the virtual image A) of linearly polarized light displayed by the display element 12 is converted into right circularly polarized light by the retardation plate 14.

The virtual image A of right circularly polarized light that is converted by the retardation plate 14 is emitted to the observation position by the user U by the liquid crystal layer 34 of the polarization diffraction element 18.

Here, in the image display apparatus 10 according to the embodiment of the present invention, the liquid crystal layer 34 of the polarization diffraction element 18 has the above-described liquid crystal alignment pattern and has the region in which the single period A of the liquid crystal alignment pattern gradually decreases in the direction away from the display element 12.

Therefore, in the image display apparatus 10 according to the embodiment of the present invention, the entire surface of the virtual image A displayed by the display element 12 can be appropriately emitted to the observation position by the user U.

In addition, in the image display apparatus 10 according to the embodiment of the present invention, ideally, the reflectivity of right circularly polarized light of green light by the liquid crystal layer 34 can be made to be 100%.

Accordingly, the image display apparatus 10 according to the embodiment of the present invention can display the bright virtual image A.

On the other hand, in the image display apparatus 10, the real scene R transmits through the transparent substrate 16 and the polarization diffraction element 18 to be observed by the user U.

As a result, the user U of the image display apparatus 10 observes augmented reality where the virtual image A is superimposed on the real scene R.

Here, the (cholesteric) liquid crystal layer 34 of the polarization diffraction element 18 is a reflective polarization diffraction element that reflects only right circularly polarized light of green light and allows transmission of the other light. Accordingly, in the real scene R, only right circularly polarized light of green light is reflected by the liquid crystal layer 34, and the other light transmits through the polarization diffraction element 18 and reaches the observation position by the user U.

In addition, in a case where the polarization diffraction element 18 includes three liquid crystal layers 34 that correspond to and reflect red light, green light, and blue light, circularly polarized light having a turning direction opposite to that of circularly polarized light reflected by each of the liquid crystal layers 34 transmits through the polarization diffraction element 18.

That is, in the image display apparatus 10 according to the embodiment of the present invention that reflects the virtual image A using the polarization diffraction element, even in a case where the reflectivity of the liquid crystal layer 34 is improved to increase the brightness of the virtual image A, it is not necessary to decrease the brightness of the real scene R. In addition, circularly polarized light having a turning direction opposite to that of circularly polarized light reflected by the liquid crystal layer 34 transmits through the polarization diffraction element 18. Therefore, a decrease in the brightness of the real scene R by the polarization diffraction element 18 is half or less.

Accordingly, in the image display apparatus 10 according to the embodiment of the present invention, the user U can observe augmented reality where the virtual image A is superimposed on the bright real scene R.

In the above-described example, in the image display apparatus 10 according to the embodiment of the present invention, the cholesteric liquid crystal layer having the above-described liquid crystal alignment pattern is used as the reflective polarization diffraction element.

However, the present invention is not limited to this configuration, and various well-known reflective polarization diffraction elements can be used.

Examples of the reflective polarization diffraction element include a reflective polarization diffraction element formed of a birefringence material described in JP2010-525394A and a polarization diffraction element in which a diffraction structure is formed using structural birefringence described in "Erez Hasman et al., Polarization dependent focusing lens by use of quantized Pancharatnm-Berry phase diffractive optics, Applied Physics Letters, Volume 82, Number 3, pp. 328-330".

Regardless of the reflective polarization diffraction element to be used, as in the above-described image display apparatus 10, the real scene R other than predetermined polarized light that is reflected by the polarization diffraction element transmits through the polarization diffraction element. Therefore, the brightness of the real scene R can increase.

In addition, the polarization diffraction element has the region where the period of the diffraction structure decreases in the direction away from the display element. As a result, the virtual image A can be suitably emitted to the observation position by the user U.

Hereinabove, the image display apparatus and the AR glasses according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Comparative Example 1

In Comparative Example 1, a volume hologram was prepared using a method described below.

First, a holographic medium was formed based on Example 1 described in JP2012-504665A.

Next, by exposing the prepared holographic medium based on Examples described in JP2012-504665A, a reflective type volume hologram was prepared. During the exposure, the period of the diffraction structure of the volume hologram was set to 0.69 μm.

Example 1

Formation of Alignment Film

A glass substrate was used as the support. The following coating liquid for forming an alignment film was applied to the support by spin coating. The support on which the coating film of the coating liquid for forming an alignment film was formed was dried using a hot plate at 60° C. for 60 seconds. As a result, an alignment film was formed.

Coating Liquid for Forming Alignment Film

| | |
|---|---|
| The following material for photo-alignment | ... 1.00 part by mass |
| Water | ... 16.00 parts by mass |
| Butoxyethanol | ... 42.00 parts by mass |
| Propylene glycol monomethyl ether | ... 42.00 parts by mass |

Material for Photo-Alignment

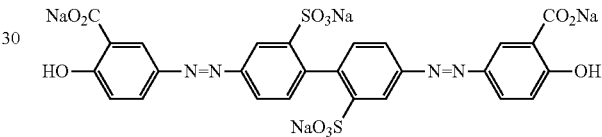

Exposure of Alignment Film

By disposing a lens element after a λ/4 plate in the exposure device shown in FIG. 9 and exposing the alignment film, an alignment film P-1 having an alignment pattern was formed.

In the exposure device, a laser that emits laser light having a wavelength (325 nm) was used as the laser. The exposure amount of the interference light was 1000 mJ/cm$^2$. The single period (the length over which the optical axis rotates by 180°) of an alignment pattern formed by interference of two laser beams was controlled by changing an intersecting angle (intersecting angle α) between the two beams and a lens shape.

Formation of Cholesteric Liquid Crystal Layer

As the liquid crystal composition forming the cholesteric liquid crystal layer, the following composition A-1 was prepared. This composition A-1 is a liquid crystal composition forming a cholesteric liquid crystal layer (cholesteric liquid crystalline phase) that reflects right circularly polarized light.

Composition A-1

| | |
|---|---|
| Rod-Like liquid crystal compound L-1 | ... 100.00 parts by mass |
| Polymerization initiator (IRGACURE (registered. . . trade name) 907, manufactured by BASF SE) | 3.00 parts by mass |

-continued

| | |
|---|---|
| Photosensitizer (KAYACURE DETX-S, manufactured by Nippon Kayaku Co., Ltd.) | ... 1.00 part by mass |
| Chiral agent Ch-1 | ... 5.43 parts by mass |
| Leveling agent T-1 | ... 0.08 parts by mass |
| Methyl ethyl ketone | ... 203.00 parts by mass |

In addition, the cholesteric liquid crystal layer was cut in a direction along the rotation direction of the optical axis of the liquid crystal compound, and a cross section was observed with a SEM.

As a result, bright portions and dark portions were tilted to a main surface of the cholesteric liquid crystalline phase. An interval of the bright portions and the dark portions, that is, a tilted surface pitch was substantially uniform. The tilted Rod-Like liquid crystal compound L-1

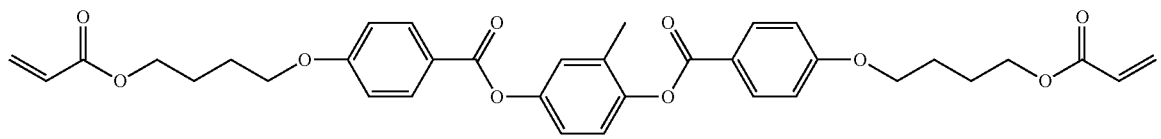

84%

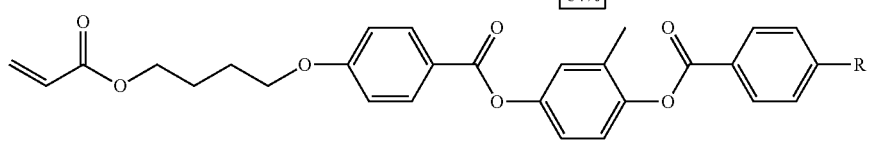

14%

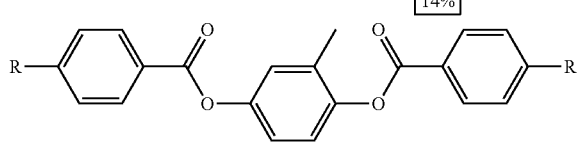

2%

Chiral Agent Ch-1

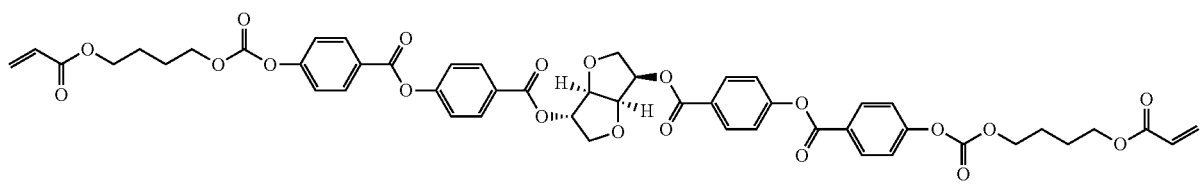

Leveling Agent T-1

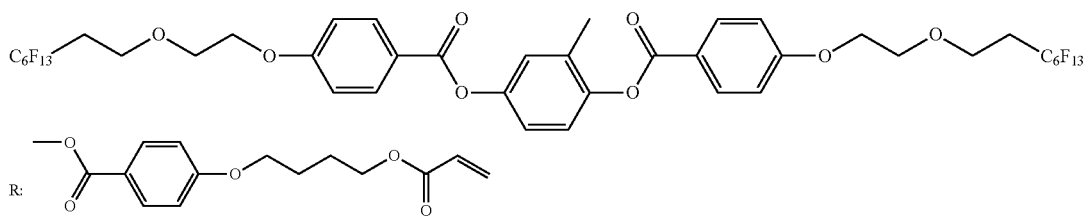

The above-described composition A-1 was applied to the alignment film P-1.

The coating film of the composition A-1 was heated on a hot plate at 80° C. for 3 minutes (180 sec). Next, the coating film was irradiated with ultraviolet light having a wavelength of 365 nm at 80° C. at an irradiation dose of 600 mJ/cm$^2$ using a high-pressure mercury lamp in a nitrogen atmosphere. As a result, the composition A-1 was cured, the alignment of the liquid crystal compound was immobilized, a cholesteric liquid crystal layer was formed, and a polarization diffraction element was prepared.

It was verified using a polarization microscope that the cholesteric liquid crystal layer had a periodically aligned surface as shown in FIG. 3.

surface pitch of the cholesteric liquid crystalline phase measured from the bright portions and the dark portions was 0.37 μm. The tilted surface pitch was measured by setting the interval between the bright portions or between the dark portions in the normal direction with respect to the lines as a ½ pitch (refer to FIG. 4).

As described above, the bright portions and the dark portions described herein refer to bright portions and dark portions derived from a cholesteric liquid crystalline phase in a case where a cross section of the cholesteric liquid crystal layer was observed with a SEM.

In addition, in a case where a cross section of the coating layer was observed with a SEM, in the liquid crystal alignment pattern of the cholesteric liquid crystal layer 1, the single period Λ over which the optical axis of the liquid crystal compound rotated by 180° was changed.

The single period Λ of the liquid crystal alignment pattern was 2.0 µm at a position of 5 mm from an end part, was 0.69 µm at a position of 9.9 mm from an end part, and was 0.37 µm at a position of 19.4 mm from an end part.

Example 2

Using the same method as that of Example 1, the alignment film P-1 was formed on a support and exposed.

Formation of Cholesteric Liquid Crystal Layer

As the liquid crystal composition forming the cholesteric liquid crystal layer, the following composition A-2 was prepared. This composition A-2 is a liquid crystal composition forming a cholesteric liquid crystal layer (cholesteric liquid crystalline phase) that reflects right circularly polarized light. Composition A-2

| | |
|---|---|
| Rod-Like liquid crystal compound L-1 | ... 100.00 parts by mass |
| Polymerization initiator (KAYACURE DETX-S, manufactured by Nippon Kayaku Co., Ltd.) | ... 1.00 part by mass |
| Chiral agent Ch-1 | ... 3.90 parts by mass |
| Chiral agent Ch-2 | ... 1.00 parts by mass |
| Methyl ethyl ketone | ... 203.00 parts by mass |

The above-described composition A-2 was applied to the alignment film P-1.

The coating film of the composition A-2 was heated on a hot plate at 80° C. for 3 minutes.

Next, the first exposure for changing the HTP of the chiral agent was performed using a high-pressure mercury lamp at 80° C. in the air atmosphere through a long pass filter of 300 nm and a short pass filter of 350 nm. The first exposure was performed such that the light irradiation dose measured at a wavelength of 315 nm was 10 mJ/cm².

Next, the second expression for curing the liquid crystal composition was performed at 80° C. by irradiating the coating film with ultraviolet light having a wavelength of 365 nm at an irradiation dose of 600 mJ/cm² using a high-pressure mercury lamp in a nitrogen atmosphere. As a result, the liquid crystal composition A-2 was cured, the alignment of the liquid crystal compound was immobilized, a cholesteric liquid crystal layer was formed, and a polarization diffraction element was prepared.

It was verified using a polarization microscope that the cholesteric liquid crystal layer had a periodically aligned surface as shown in FIG. 3.

In addition, the cholesteric liquid crystal layer was cut in a direction along the rotation direction of the optical axis of the liquid crystal compound, and a cross section was observed with a SEM.

As a result, bright portions and dark portions were tilted to a main surface of the cholesteric liquid crystalline phase. In addition, a state where an interval of the bright portions and the dark portions in a normal direction, that is, a tilted surface pitch continuously increased in the thickness direction from the alignment film side to a side away from the alignment film was observed. The average value of the tilted surface pitch was 0.37 µm.

In addition, in a case where a cross section of the coating layer was observed with a SEM, in the liquid crystal alignment pattern of the cholesteric liquid crystal layer 1, the single period Λ over which the optical axis of the liquid crystal compound rotated by 180° was changed.

The single period Λ of the liquid crystal alignment pattern was 2.0 µm at a position of 5 mm from an end part, was 0.69 µm at a position of 9.9 mm from an end part, and was 0.37 µm at a position of 19.4 mm from an end part.

Example 3

Using the same method as that of Example 1, the alignment film P-1 was formed on a support and exposed.

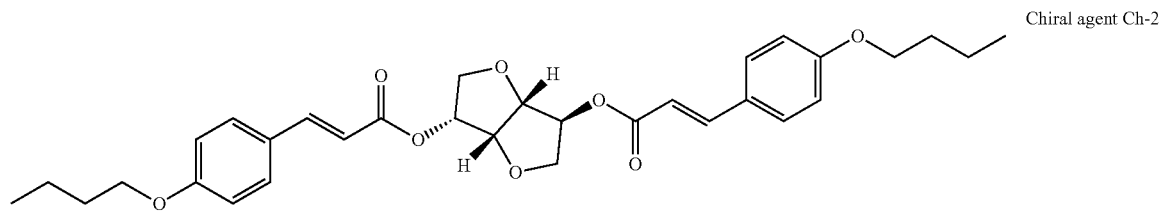 [SMILES: CCCCOc1ccc(/C=C/C(=O)O[C@H]2CO[C@H]3[C@@H]2OC[C@H]3OC(=O)/C=C/c2ccc(OCCCC)cc2)cc1]

Chiral agent Ch-2

Formation of Cholesteric Liquid Crystal Layer

As the liquid crystal composition forming the cholesteric liquid crystal layer, the following composition A-3 was prepared. This composition A-3 is a liquid crystal composition forming a cholesteric liquid crystal layer (cholesteric liquid crystalline phase) that reflects right circularly polarized light. Composition A-3

| | |
|---|---|
| Rod-Like liquid crystal compound L-1 | ... 100.00 parts by mass |
| Polymerization initiator (KAYACURE DETX-S, manufactured by Nippon Kayaku Co., Ltd.) | ... 1.00 part by mass |
| Chiral agent Ch-3 | ... 3.76 parts by mass |
| Methyl ethyl ketone | ... 142.00 parts by mass |

Chiral Agent Ch-3

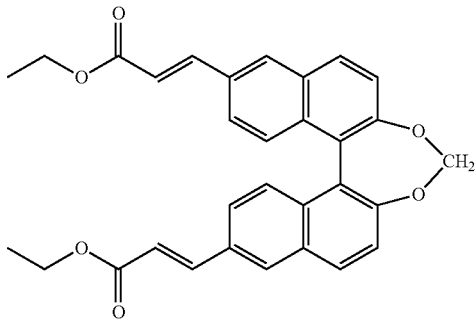

The above-described composition A-3 was applied to the alignment film P-1.

The coating film of the composition A-3 was heated on a hot plate at 100° C. for 3 minutes.

Next, the first exposure for changing the HTP of the chiral agent was performed using a high-pressure mercury lamp at 100° C. in a nitrogen atmosphere through a long pass filter of 300 nm and a short pass filter of 350 nm. The first exposure was performed such that the light irradiation dose measured at a wavelength of 315 nm was 9 mJ/cm$^2$.

Next, the second expression for curing the liquid crystal composition was performed at 100° C. by irradiating the coating film with ultraviolet light having a wavelength of 365 nm at an irradiation dose of 1000 mJ/cm$^2$ using a high-pressure mercury lamp in a nitrogen atmosphere. As a result, the liquid crystal composition A-3 was cured, the alignment of the liquid crystal compound was immobilized, a cholesteric liquid crystal layer was formed, and a polarization diffraction element was prepared.

It was verified using a polarization microscope that the cholesteric liquid crystal layer had a periodically aligned surface as shown in FIG. 3.

In addition, the cholesteric liquid crystal layer was cut in a direction along the rotation direction of the optical axis of the liquid crystal compound, and a cross section was observed with a SEM.

As a result, bright portions and dark portions were tilted to a main surface of the cholesteric liquid crystalline phase. A state where an interval of the bright portions and the dark portions in a normal direction, that is, a tilted surface pitch continuously increased in the thickness direction from the alignment film side to a side away from the alignment film was observed. A change in the tilted surface pitch from the alignment film side to a side away from the alignment film was more than that of Example 2. The average value of the tilted surface pitch was 0.37 μm.

In addition, in a case where a cross section of the coating layer was observed with a SEM, in the liquid crystal alignment pattern of the cholesteric liquid crystal layer 1, the single period Λ over which the optical axis of the liquid crystal compound rotated by 180° was changed.

The single period Λ of the liquid crystal alignment pattern was 2.0 μm at a position of 5 mm from an end part, was 0.69 μm at a position of 9.9 mm from an end part, and was 0.37 μm at a position of 19.4 mm from an end part.

Evaluation

Reflection Wavelength Range

Using a gonio-spectrophotometer (GSP-1B, manufactured by Murakami Color Research Laboratory Co., Ltd.), the reflection wavelength range of the cholesteric liquid crystal layer was measured with the above-described method.

The reflection wavelength range was measured in a case where measurement light was incident from a direction tilted at 50° with respect to the normal line of the cholesteric liquid crystal layer. Assuming that the incidence position of incidence light was a position of 9.9 mm from an end part of the cholesteric liquid crystal layer (the single period of the liquid crystal alignment pattern was 0.69 μm), the reflection angle varied depending on wavelengths, and thus the measurement was performed while changing the angle of the light receiving section.

Brightness of Virtual Image

Using the prepared polarization diffraction element, the image display apparatus shown in FIG. 1 was prepared.

A laser having a wavelength of 532 nm was used as a display element (light source), a circular polarization plate was disposed on a front surface of the light source, and right circularly polarized light was incident into the cholesteric liquid crystal layer.

The polarization diffraction element was disposed such that the single period Λ in the cholesteric liquid crystal layer decreased in a direction away from the display element.

Light was incident from the display element into the cholesteric liquid crystal layer while changing the incidence angle in a range of ±15° in a state where the light was tilted by 50° from the normal direction of the cholesteric liquid crystal layer. That is, light was incident from the display element in a range of 35° to 65° with respect to the normal line of the cholesteric liquid crystal layer. In addition, the polarization diffraction element was disposed such that light having an incidence angle of 35° was incident into a position of 5.0 mm from an end part of the cholesteric liquid crystal layer (the single period of the liquid crystal alignment pattern was 2.0 μm), light having an incidence angle of 50° was incident into a position of 9.9 mm from an end part of the cholesteric liquid crystal layer (the single period of the liquid crystal alignment pattern was 0.69 μm), and light having an incidence angle of 65° was incident into a position of 19.4 mm from an end part of the cholesteric liquid crystal layer (the single period of the liquid crystal alignment pattern was 0.37 μm).

Reflected light from the cholesteric liquid crystal layer was measured using a power meter.

In Comparative Examples and Examples, the thickness of the element and the exposure amount of interference exposure were adjusted such that the reflectivity (diffraction efficiency) with respect to an incidence angle of 50° was 50%.

Using the measurement result of the power meter, the brightness uniformity was evaluated based on the average value of the amount of light reflected from the diffraction element with respect to the incidence angle in a range of ±15°.

As a result, the brightness uniformity of Example 3 was the highest (Evaluation A), the brightness uniformity of Example 2 was the second highest (Evaluation B), the brightness uniformity of Example 1 was the third highest (Evaluation C), and the brightness uniformity of Comparative Example 1 was the lowest (Evaluation D).

In addition, in Examples 1 to 3, reflected light of light incident at incidence angles 35°, 50°, and 65° interfered with each other substantially at the same position. That is, by disposing a pupil at the interference position in Examples 1 to 3, the virtual image was able to be recognized in a range of ±15°. On the other hand, in Comparative Example 1, reflected light of light incident at incidence angles 35°, 50°, and 65° did not interfere with each other at the same position. That is, in Comparative Example 1, the virtual image was able to be recognized in the entire range of ±15°. Accordingly, by setting the single period Λ of the diffraction structure of the diffraction element to decrease in the direction away from the display element, the virtual image was able to be recognized in a wide visual field range.

Brightness of Real Scene

Using the prepared polarization diffraction element, the image display apparatus shown in FIG. 1 was prepared.

As the light of the real scene, a laser having a wavelength of 532 nm was used and was incident from a surface opposite to the surface where light was incident in the above-described virtual image evaluation. Light was incident from the normal direction with respect to the main surface of the cholesteric liquid crystal layer into a position of 9.9 mm from an end part of the cholesteric liquid crystal layer (the single period of the liquid crystal alignment pattern was 0.69 μm), and transmitted light (transmittance) from the cholesteric liquid crystal layer was measured using a power meter.

A case where the transmittance was improved by 20% or more with respect to that of Comparative Example 1 (Evaluation D) was evaluated as A A case where the transmittance was improved by 10% or more and less than 20% with respect to that of Comparative Example 1 (Evaluation D) was evaluated as B A case where the transmittance was improved by 5% or more and less than 10% with respect to that of Comparative Example 1 (Evaluation D) was evaluated as C The results are shown in the following table.

Formation of Cholesteric Liquid Crystal Layer

The cholesteric liquid crystal layer was formed using the same method as that of Example 2, except that the amount of the chiral agent Ch-1 was changed to 3.1 parts by mass.

It was verified using a polarization microscope that the cholesteric liquid crystal layer had a periodically aligned surface as shown in FIG. 3.

In addition, the cholesteric liquid crystal layer was cut in a direction along the rotation direction of the optical axis of the liquid crystal compound, and a cross section was observed with a SEM.

As a result, bright portions and dark portions were tilted to a main surface of the cholesteric liquid crystal layer. A state where an interval of the bright portions and the dark portions in a normal direction, that is, a tilted surface pitch continuously increased in the thickness direction from the alignment film side to a side away from the alignment film was observed. The average value of the tilted surface pitch was 0.45 μm.

In addition, in a case where a cross section of the coating layer was observed with a SEM, in the liquid crystal alignment pattern of the cholesteric liquid crystal layer 1, the single period Λ over which the optical axis of the liquid crystal compound rotated by 180° was changed.

The single period Λ of the liquid crystal alignment pattern was 2.4 μm at a position of 5 mm from an end part, was 0.83 μm at a position of 9.9 mm from an end part, and was 0.44 μm at a position of 19.4 mm from an end part.

The above-described cholesteric liquid crystal layer was laminated on the cholesteric liquid crystal layer prepared in Example 2 in the image display apparatus prepared in Example 2.

Using the prepared image display apparatus, the brightness was evaluated using the same method as that of the

TABLE 1

|  | Comparative Example 1 | Example 1 | Example 2 | Example 3 |
| --- | --- | --- | --- | --- |
| Diffraction Element | Volume Hologram | Polarization Diffraction Element | Polarization Diffraction Element | Polarization Diffraction Element |
| Change in Single Period of Alignment Pattern | — | Changed | Changed | Changed |
| Tilted Surface Pitch [μm] | — | 0.37 | 0.37 | 0.37 |
| Change in Tilted Surface Pitch | — | Uniform | Changed | Changed |
| Reflection Wavelength Range | <30 | 50 | 100 | 200 |
| Brightness of Virtual Image | D | C | B | A |
| Brightness of Real Scene | D | A | A | A |

In the evaluation, at the same reflectivity (diffraction efficiency), the brighter real scenes were obtained in Examples 1 to 3 as compared to Comparative Example 1. On the other hand, at the same brightness of the real scene, the brighter virtual images were obtained in Examples 1 to 3 as compared to Comparative Example 1.

Example 4

The alignment film P-1 was formed on the support and was exposed using the same method as that of Example 1, except that the intersecting angle α and the lens shape were changed.

evaluation of the brightness of the virtual image in Example 2, except that the wavelength of the laser light source was changed to 635 nm.

In addition, the polarization diffraction element was disposed such that light having an incidence angle of 35° was incident into a position of 5.0 mm from an end part of the cholesteric liquid crystal layer (the single period of the liquid crystal alignment pattern was 2.4 μm), light having an incidence angle of 50° was incident into a position of 9.9 mm from an end part of the cholesteric liquid crystal layer (the single period of the liquid crystal alignment pattern was 0.83 μm), and light having an incidence angle of 65° was incident into a position of 19.4 mm from an end part of the cholesteric liquid crystal layer (the single period of the liquid crystal alignment pattern was 0.44 μm).

It was verified that the brightness uniformity in Example 4 was the same as that of Example 2. In addition, it was verified that in Example, 4, light having a wavelength of 532 nm and light having a wavelength of 635 nm were reflected substantially in the same direction at incidence angles of 35°, 50°, and 65° and intersected with each other at the same position. That is, by disposing a pupil at the interference position in Example 4, the virtual image having a wavelength of 532 nm and the virtual image having a wavelength of 635 nm were able to be recognized in a range of ±15°.

As can be seen from the above results, the effects of the present invention are obvious.

The present invention is suitably applicable to an image display apparatus such as AR glasses or a HUD that displays augmented reality.

Explanation of References 10, 100: image display apparatus
12, 102: display element
14: retardation plate
16: transparent substrate
18: polarization diffraction element
30: support
32: alignment film
34: (cholesteric) liquid crystal layer
40: liquid crystal compound
40A: optical axis
42: bright portion
44: dark portion
60: exposure device
62: laser
64: light source
65: $\lambda/2$ plate
68: polarization beam splitter
70a, 70B: mirror
72A, 72B: $\lambda/4$ plate
104: spectacle lens
106: transparent combiner
A: virtual image
R: real scene
$G_R$: right circularly polarized light of green light
M: laser light
MA, MB: beam
$P_O$: linearly polarized light
$P_R$: right circularly polarized light
$P_L$: left circularly polarized light
U: user
D: arrangement axis
$\Lambda$: single period (period of diffraction structure)
P (tilted) surface pitch

What is claimed is:

1. An image display apparatus comprising:
a display element; and
a reflective polarization diffraction element that reflects an image displayed by the display element,
wherein the polarization diffraction element is arranged such that a distance between a main surface of the polarization diffraction element and the display element increases in one direction, and
wherein the polarization diffraction element has a region where a period of a diffraction structure decreases in a direction away from the display element.

2. The image display apparatus according to claim 1, further comprising:
a transparent substrate that supports the polarization diffraction element.

3. The image display apparatus according to claim 2,
wherein the polarization diffraction element includes a cholesteric liquid crystal layer obtained by immobilizing a cholesteric liquid crystalline phase, and
the cholesteric liquid crystal layer has a liquid crystal alignment pattern in which a direction of an optical axis derived from a liquid crystal compound changes while continuously rotating in at least one in-plane direction.

4. The image display apparatus according to claim 3,
wherein the polarization diffraction element includes a plurality of cholesteric liquid crystal layers in which surface pitches are different from each other in cross sections of the cholesteric liquid crystal layers observed with a scanning electron microscope, the surface pitch being an interval of bright portions and dark portions derived from the cholesteric liquid crystalline phase.

5. The image display apparatus according to claim 4,
wherein in a case where, in the liquid crystal alignment pattern, a length over which the direction of the optical axis derived from the liquid crystal compound rotates by 180° in the one in-plane direction in which the direction of the optical axis derived from the liquid crystal compound changes while continuously rotating is set as a single period,
a permutation of lengths of the surface pitches and a permutation of lengths of the single periods match each other in the plurality of cholesteric liquid crystal layers in which the surface pitches are different from each other.

6. The image display apparatus according to claim 2,
wherein a retardation plate is provided between the display element and the polarization diffraction element.

7. The image display apparatus according to claim 6,
wherein the retardation plate is a $\lambda/4$ plate.

8. The image display apparatus according to claim 1,
wherein the polarization diffraction element includes a cholesteric liquid crystal layer obtained by immobilizing a cholesteric liquid crystalline phase, and
the cholesteric liquid crystal layer has a liquid crystal alignment pattern in which a direction of an optical axis derived from a liquid crystal compound changes while continuously rotating in at least one in-plane direction.

9. The image display apparatus according to claim 8,
wherein the polarization diffraction element includes a plurality of cholesteric liquid crystal layers in which surface pitches are different from each other in cross sections of the cholesteric liquid crystal layers observed with a scanning electron microscope, the surface pitch being an interval of bright portions and dark portions derived from the cholesteric liquid crystalline phase.

10. The image display apparatus according to claim 9,
wherein in a case where, in the liquid crystal alignment pattern, a length over which the direction of the optical axis derived from the liquid crystal compound rotates by 180° in the one in-plane direction in which the direction of the optical axis derived from the liquid crystal compound changes while continuously rotating is set as a single period,
a permutation of lengths of the surface pitches and a permutation of lengths of the single periods match each other in the plurality of cholesteric liquid crystal layers in which the surface pitches are different from each other.

11. The image display apparatus according to claim 10,
wherein in the cholesteric liquid crystal layers adjacent to each other in the plurality of cholesteric liquid crystal layers in which the surface pitches are different from each other, turning directions of circularly polarized light to be selectively reflected are opposite to each other.

12. The image display apparatus according to claim 9, wherein in the cholesteric liquid crystal layers adjacent to each other in the plurality of cholesteric liquid crystal layers in which the surface pitches are different from each other, turning directions of circularly polarized light to be selectively reflected are opposite to each other.

13. The image display apparatus according to claim 9, wherein in a case where an in-plane retardation is measured from a normal direction of a main surface of the cholesteric liquid crystal layer and a direction tilted with respect to a normal line of the main surface, a direction in which the in-plane retardation is the minimum in any one of a slow axis plane or a fast axis plane is tilted from the normal direction.

14. The image display apparatus according to claim 9, wherein the cholesteric liquid crystal layer has a pitch gradient structure that is a structure having a region where a surface pitch changes in a cross section of the cholesteric liquid crystal layer observed with a scanning electron microscope, the surface pitch being an interval of bright portions and dark portions derived from the cholesteric liquid crystalline phase.

15. The image display apparatus according to claim 8, wherein in a case where an in-plane retardation is measured from a normal direction of a main surface of the cholesteric liquid crystal layer and a direction tilted with respect to a normal line of the main surface, a direction in which the in-plane retardation is the minimum in any one of a slow axis plane or a fast axis plane is tilted from the normal direction.

16. The image display apparatus according to claim 8, wherein the cholesteric liquid crystal layer has a pitch gradient structure that is a structure having a region where a surface pitch changes in a cross section of the cholesteric liquid crystal layer observed with a scanning electron microscope, the surface pitch being an interval of bright portions and dark portions derived from the cholesteric liquid crystalline phase.

17. The image display apparatus according to claim 1, wherein a retardation plate is provided between the display element and the polarization diffraction element.

18. The image display apparatus according to claim 17, wherein the retardation plate is a 24 plate.

19. The image display apparatus according to claim 17, wherein the retardation plate has reverse wavelength dispersibility.

20. AR glasses comprising:
the image display apparatus according to claim 1.

21. An image display apparatus comprising:
a display element; and
a reflective polarization diffraction element that reflects an image displayed by the display element,
wherein the polarization diffraction element is arranged such that a distance between a main surface of the polarization diffraction element and the display element increases in one direction,
the polarization diffraction element includes a cholesteric liquid crystal layer obtained by immobilizing a cholesteric liquid crystalline phase, and the cholesteric liquid crystal layer has a liquid crystal alignment pattern in which a direction of an optical axis derived from a liquid crystal compound changes while continuously rotating in at least one in-plane direction,
in a case where, in the liquid crystal alignment pattern, a length over which the direction of the optical axis derived from the liquid crystal compound rotates by 180° in the one in-plane direction in which the direction of the optical axis derived from the liquid crystal compound changes while continuously rotating is set as a single period, and
the cholesteric liquid crystal layer has a region where the single period decreases in the one direction.

22. The image display apparatus according to claim 21, wherein the cholesteric liquid crystal layer has a region where the single period gradually decreases in the one direction.

* * * * *